US010810501B1

(12) United States Patent
Kimchi et al.

(10) Patent No.: US 10,810,501 B1
(45) Date of Patent: Oct. 20, 2020

(54) AUTOMATED PRE-FLIGHT AND IN-FLIGHT TESTING OF AERIAL VEHICLES BY MACHINE LEARNING

(71) Applicant: Amazon Technologies, Inc., Seattle, WA (US)

(72) Inventors: Gur Kimchi, Bellevue, WA (US); Michael Piedmonte, Kirkland, WA (US); Liam Stewart Cavanaugh Pingree, Seattle, WA (US); Joshua White Traube, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 434 days.

(21) Appl. No.: 15/789,185

(22) Filed: Oct. 20, 2017

(51) Int. Cl.
*G06N 5/04* (2006.01)
*B64C 39/02* (2006.01)
*B64D 45/00* (2006.01)
*G08G 5/00* (2006.01)
*G06N 20/00* (2019.01)

(52) U.S. Cl.
CPC ............. *G06N 5/04* (2013.01); *B64C 39/024* (2013.01); *B64D 45/00* (2013.01); *G06N 20/00* (2019.01); *G08G 5/0069* (2013.01); *B64C 2201/127* (2013.01); *B64D 2045/0085* (2013.01)

(58) Field of Classification Search
CPC ........................................................ G06N 5/04
See application file for complete search history.

(56) References Cited

U.S. PATENT DOCUMENTS

| 4,895,448 | A | 1/1990 | Laird |
| 6,360,193 | B1 * | 3/2002 | Stoyen .................. G09B 9/003 703/17 |
| 6,622,135 | B1 | 9/2003 | Tremiolles et al. |
| 2004/0141175 | A1 | 7/2004 | Baldwin et al. |
| 2007/0280501 | A1 | 12/2007 | Walton |

(Continued)

OTHER PUBLICATIONS

A. Krizhevsky, I. Sutskever, and G. E. Hinton. Imagenet classification with deep convolutional neural networks. NIPS 12 Proceedings of the 25th Int'l Conference on Neural Information Processing Systems (vol. 1), Lake Tahoe, Nevada, pp. 1097-1105, 2012.

(Continued)

*Primary Examiner* — Donald J Wallace
(74) *Attorney, Agent, or Firm* — Athorus, PLLC

(57) ABSTRACT

Data captured during evolutions performed by aerial vehicles prior to one or more missions, and data regarding outcomes of the missions, may be used to train a machine learning system to predict data regarding an outcome of a mission of an aerial vehicle based on the performance of the aerial vehicle during one or more evolutions. The data may be captured by sensors provided aboard an aerial vehicle, or in association with a testing facility, and may include data captured during both pre-flight and/or in-flight evolutions performed by the aerial vehicle. The evolutions may include any pre-flight operation of motors, propellers and/or control surfaces, or any other components, as well as the in-flight operation of such components. If a machine learning system determines that a mission is unlikely to succeed, the mission may be canceled, delayed until further inspections may be performed, or assigned to another aerial vehicle.

20 Claims, 21 Drawing Sheets

(56) References Cited

U.S. PATENT DOCUMENTS

| | | | |
|---|---|---|---|
| 2010/0235037 | A1 | 9/2010 | Vian et al. |
| 2012/0250010 | A1 | 10/2012 | Hannay |
| 2014/0067164 | A1 | 3/2014 | Papadopoulos et al. |
| 2015/0336671 | A1 | 11/2015 | Winn et al. |
| 2015/0346107 | A1 | 12/2015 | Kim et al. |
| 2015/0355101 | A1 | 12/2015 | Sun |
| 2016/0003954 | A1 | 1/2016 | Broussard et al. |
| 2016/0093124 | A1 | 3/2016 | Shi et al. |
| 2016/0245279 | A1* | 8/2016 | Pal ................... G01M 3/26 |
| 2016/0264262 | A1 | 9/2016 | Colin et al. |
| 2016/0376031 | A1 | 12/2016 | Michalski et al. |
| 2016/0379154 | A1 | 12/2016 | Rodoni |
| 2017/0308802 | A1* | 10/2017 | Ramsoy ............. H04L 63/0421 |
| 2017/0328838 | A1 | 11/2017 | Umehara |
| 2018/0068433 | A1 | 3/2018 | Imakoga |
| 2018/0322366 | A1 | 11/2018 | Lim et al. |
| 2018/0342069 | A1 | 11/2018 | Lim et al. |
| 2018/0346151 | A1* | 12/2018 | Sturlaugson ............ B64F 5/60 |
| 2019/0012579 | A1 | 1/2019 | Namiki |

OTHER PUBLICATIONS

A. Radford, L. Metz, and S. Chintala. Unsupervised Representation Learning with Deep Convolutional Generative Adversarial Networks. Submitted as Conference Paper for ICLR 2016, San Juan, Puerto Rico, May 2-4, 2016.

A. Shrivastava, T. Pfister, O. Tuzel, J. Susskind, W. Wang, and R. Webb. Learning from Simulated and Unsupervised Images through Adversarial Training. Submitted Nov. 15, 2016, for oral presentation at Conference on Computer Vision and Pattern Recognition (CVPR 2017), Honolulu, Hawaii; presented at CVPR 2017 on Jul. 23, 2017.

B. Zhou, A. Khosla, A. Lapedriza, A. Oliva, and A. Torralba. Learning Deep Features for Discriminative Localization. In Proceedings of the IEEE Conference on Computer Vision and Pattern Recognition (CVPR 2016), Las Vegas, Nevada, pp. 2921-2929, IEEE 2016.

D. Soukup and R. Huber-Mörk. Convolutional Neural Networks for Steel Surface Defect Detection from Photometric Stereo Images, pp. 668-677. Advances in Visual Computing, 10th Int'l Symposium (ISVC 2014), Las Vegas, Nevada, Dec. 8-10, 2014. Springer International Publishing, Switzerland, 2014 (LNCS 8887).

D. Kingma and J. Ba. Adam: A Method for Stochastic Optimization, The Hebrew University of Jerusalem, Advanced Seminar in Deep Learning, Oct. 18, 2015.

D. Kingma and J. Ba. Adam: A method for stochastic optimization. Published at the 3rd International Conference for Learning Representations (ICLR 2015), San Diego, May 9, 2015.

D. Martin. A Practical Guide to Machine Vision Lighting, Advanced Illumination, Rochester, Vt., Feb. 2012.

D. Mery and M.A. Berti. Automatic Detection of Welding Defects Using Texture Features. Insight-Non-Destructive Testing and Condition Monitoring, 45(10):676-681, 2003. Presented at Int'l Symposium on Computed Tomography and Image Processing for Industrial Radiology, Berlin, Germany, Jun. 23-25, 2003.

D. Sammons, W.P. Winfree, E. Burke, and S. Ji. Segmenting delaminations in carbon fiber reinforced polymer composite CT using convolutional neural networks. AIP Conference Proceedings, vol. 1706, p. 110014. American Institute of Physics, AIP Publishing, 2016.

D. Vernon. Machine Vision: Automated Visual Inspection and Robot Vision. Automatica, vol. 30, No. 4, pp. 731-732 (1994), Elsevier Science, Ltd., Great Britain.

D. Wang, A. Khosla, R. Gargeya, H. Irshad, and A. H. Beck. Deep Learning for Identifying Metastatic Breast Cancer. Computer Research Repository (CoRR), Jun. 18, 2016.

G. Wang and T. Liao. Automatic identification of different types of welding defects in radiographic images. NDT&E International, 35(8):519-528 (2002), Elsevier Science Ltd., Great Britain.

H. Raafat and S. Taboun. An Integrated Robotic and Machine Vision System for Surface Flaw Detection and Classification. Computers & Industrial Engineering, Elsevier Science Ltd., Great Britain, 30(1):27-40, 1996.

I. Goodfellow, J. Pouget-Abadie, M. Mirza, B. Xu, D. Warde-Farley, S. Ozair, A. Courville, and Y. Ben-gio. Generative adversarial nets. Advances in Neural Information Processing Systems (NIPS 2014), pp. 2672-2680, 2014.

J. Deng, W. Dong, R. Socher, L.-J. Li, K. Li, and L. Fei-Fei. Imagenet: A large-scale hierarchical image database. In IEEE Conference on Computer Vision and Pattern Recognition, 2009 (CVPR 2009), Miami, Florida, pp. 248-255. IEEE 2009.

J. Long, E. Shelhamer, and T. Darrell. Fully Convolutional Networks for Semantic Segmentation. In Proceedings of the IEEE Conference on Computer Vision and Pattern Recognition (CVPR 2015), Boston, Mass., pp. 3431-3440, IEEE 2015.

J. Masci, U. Meier, D. Ciresan, J. Schmidhuber, and G. Fricout. Steel Defect Classification with Max-Pooling Convolutional Neural Networks. The 2012 International Joint Conference on Neural Networks (IJCNN), Brisbane, Australia, pp. 1-6. IEEE, Jun. 2012.

J. Redmon, S. Divvala, R. Girshick, and A. Farhadi. You Only Look Once: Unified, Real-Time Object Detection. Proceedings of the 2016 IEEE Conference on Computer Vision and Pattern Recognition (CVPR 2016), Las Vegas, Nevada, pp. 779-788, IEEE 2016.

K. He, X. Zhang, S. Ren, and J. Sun. Deep Residual Learning for Image Recognition. In Proceedings of the IEEE Conference on Computer Vision and Pattern Recognition (CVPR 2016), Las Vegas, Nevada, pp. 770-778, IEEE 2016.

K. Simonyan and A. Zisserman. Very Deep Convolutional Networks for Large-Scale Image Recognition. Submitted Sep. 4, 2014, for publication at 3d Int'l Conference on Learning Representations (ICLR 2015), San Diego, California. Presented May 7-9, 2015.

N. Srivastava, G. E. Hinton, A. Krizhevsky, I. Sutskever, and R. Salakhutdinov. Dropout: A Simple Way to Prevent Neural Networks from Overfilling. Journal of Machine Learning Research, 15(1):1929-1958, 2014.

S. Ioffe and C. Szegedy. Batch normalization: Accelerating deep network training by reducing internal covariate shift. In Proceedings of the 32nd International Conference on Machine Learning, Lille, France, pp. 448-456, 2015.

T.-Y. Lin, A. RoyChowdhury, and S. Maji. Bilinear CNN Models for Fine-Grained Visual Recognition. Proceedings of the 2015 IEEE International Conference on Computer Vision (ICCV), Santiago, Chile, pp. 1449-1457, IEEE 2015.

T.-Y. Lin, P. Goyal, R. Girshick, K. He, and P. Dollar. Focal Loss for Dense Object Detection. IEEE International Conference on Computer Vision (2017), pp. 966-974, IEEE 2017.

Y. Gao, O. Beijbom, N. Zhang, and T. Darrell. Compact bilinear pooling. In Proceedings of the IEEE Conference on Computer Vision and Pattern Recognition (CVPR 2016), Las Vegas, Nevada, pp. 317-326, IEEE 2016.

Y. Liu, K. Gadepalli, M. Norouzi, G.E. Dahl, T. Kohlberger, A. Boyko, S. Venugopalan, A. Timofeev, P.Q. Nelson, G.S. Corrado, et al. Detecting Cancer Metastases on Gigapixel Pathology Images. Google Research, Mar. 8, 2017.

Wadhwa, N., Rubinstein, M., Durand, F., and Freeman, W.T. "Phase-Based Video Motion Processing," MIT Computer Science & Artificial Intelligence Lab, ACM Transactions on Graphics, vol. 32, issue 4, New York, N.Y., Jul. 2013, 9 pages.

Wu, H.-Y., Rubinstein, M., Shih, E., Guttag, J., Durand, F., Freeman, W. "Eulerian Video Magnification for Revealing Subtle Changes in the World," ACM Transactions on Graphics, vol. 31, No. 4, New York, N.Y., Jul. 2012, 8 pages.

* cited by examiner

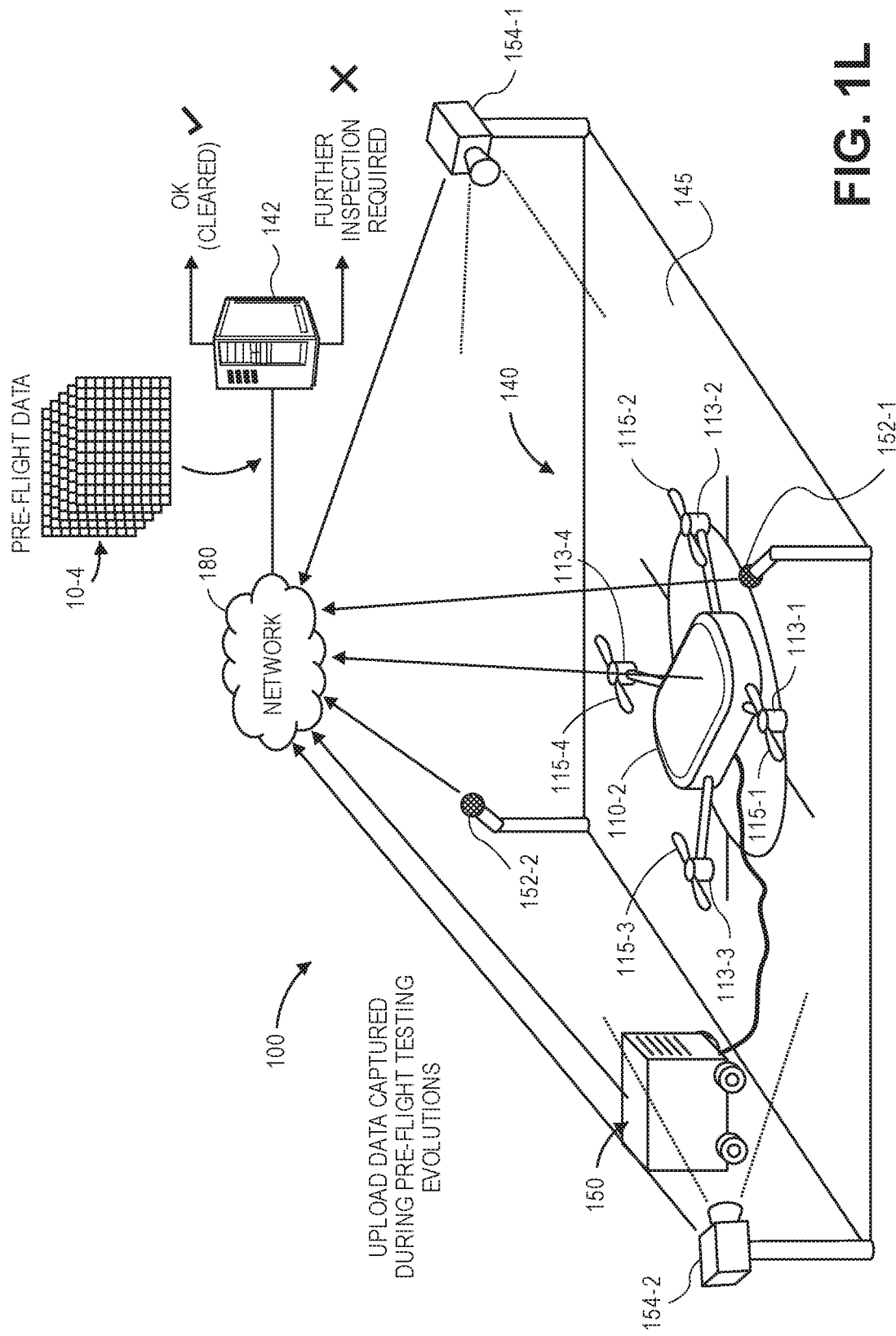

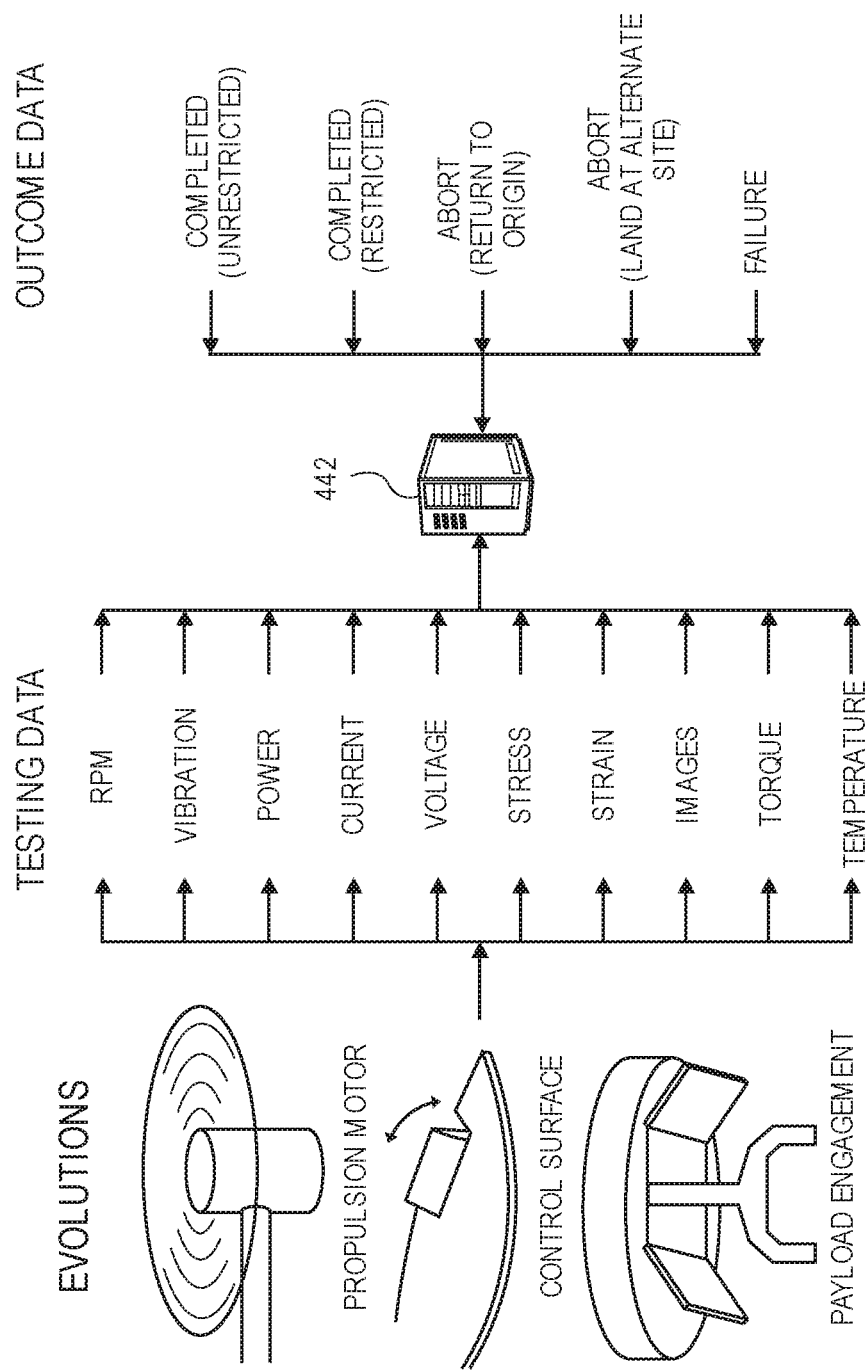

AUTOMATED PRE-FLIGHT AND IN-FLIGHT TESTING OF AERIAL VEHICLES BY MACHINE LEARNING

BACKGROUND

Aerial vehicles such as airplanes or helicopters are commonly used to transport people or cargo from origins to destinations by air. Aerial vehicles may be formed from lightweight metals, plastics or composites and equipped with motors, rotors or turbofans that are designed to meet or exceed a number of operational constraints or requirements such as speed, altitude or lift. For example, many unmanned aerial vehicles (UAVs, or drones) are built from molded plastic frames and outfitted with electric motors powered by onboard batteries or other power sources that permit the vehicles to conduct lifting or thrusting operations, while larger aerial vehicles such as jumbo jets feature aluminum, titanium or carbon fiber frames and skins and are equipped with petroleum-powered jet engines capable of generating tens of thousands of pounds-force.

From time to time, such as prior to undertaking a mission, or after operating for a nominal or predetermined number of operating hours or completing a predetermined number of missions, aerial vehicles are commonly subjected to a number of testing evolutions. Such testing evolutions are intended to determine whether an aerial vehicle is operating properly prior to embarking on a mission, or whether the strength and integrity of the various components of the aerial vehicle are sufficient for normal or expected operations. For example, testing evolutions for an aerial vehicle may involve starting up and/or operating each of its motors, control surfaces, or other powered elements, booting up or initializing one or more computer-driven machines, or taking any other actions, and data gathered during such evolutions may be interpreted to determine the airworthiness of the aerial vehicle. The data may be compared to one or more thresholds, set points, band or other mandatory conditions in order to determine whether one or more components of the aerial vehicle is operating in a satisfactory condition.

Performing testing evolutions may sometimes require taking an aerial vehicle out of service for extended durations, however. For example, depending on a size of an aerial vehicle, or a length of time since a most recent inspection, a typical testing evolution of the aerial vehicle may require several man-hours in order to be completed. Even where a manual or visual inspection results in a determination that the integrity of the aerial vehicle is sound and that the aerial vehicle is operating in a safe and satisfactory manner, the aerial vehicle must still be taken out of service in order to arrive at that determination. Moreover, where a number of testing evolutions are performed, interpreting data captured during such evolutions to determine whether the aerial vehicle may safely perform a scheduled mission, may require a substantial amount of effort on the part of one or more humans or computers, and may be inconclusive at best.

BRIEF DESCRIPTION OF THE DRAWINGS

FIGS. 1A through 1L are views of aspects of one system for automated pre-flight or in-flight testing of aerial vehicles in accordance with embodiments of the present disclosure.

FIGS. 4A and 4B are views of aspects of one system for automated pre-flight or in-flight testing of aerial vehicles in accordance with embodiments of the present disclosure.

DETAILED DESCRIPTION

Figure 1A:
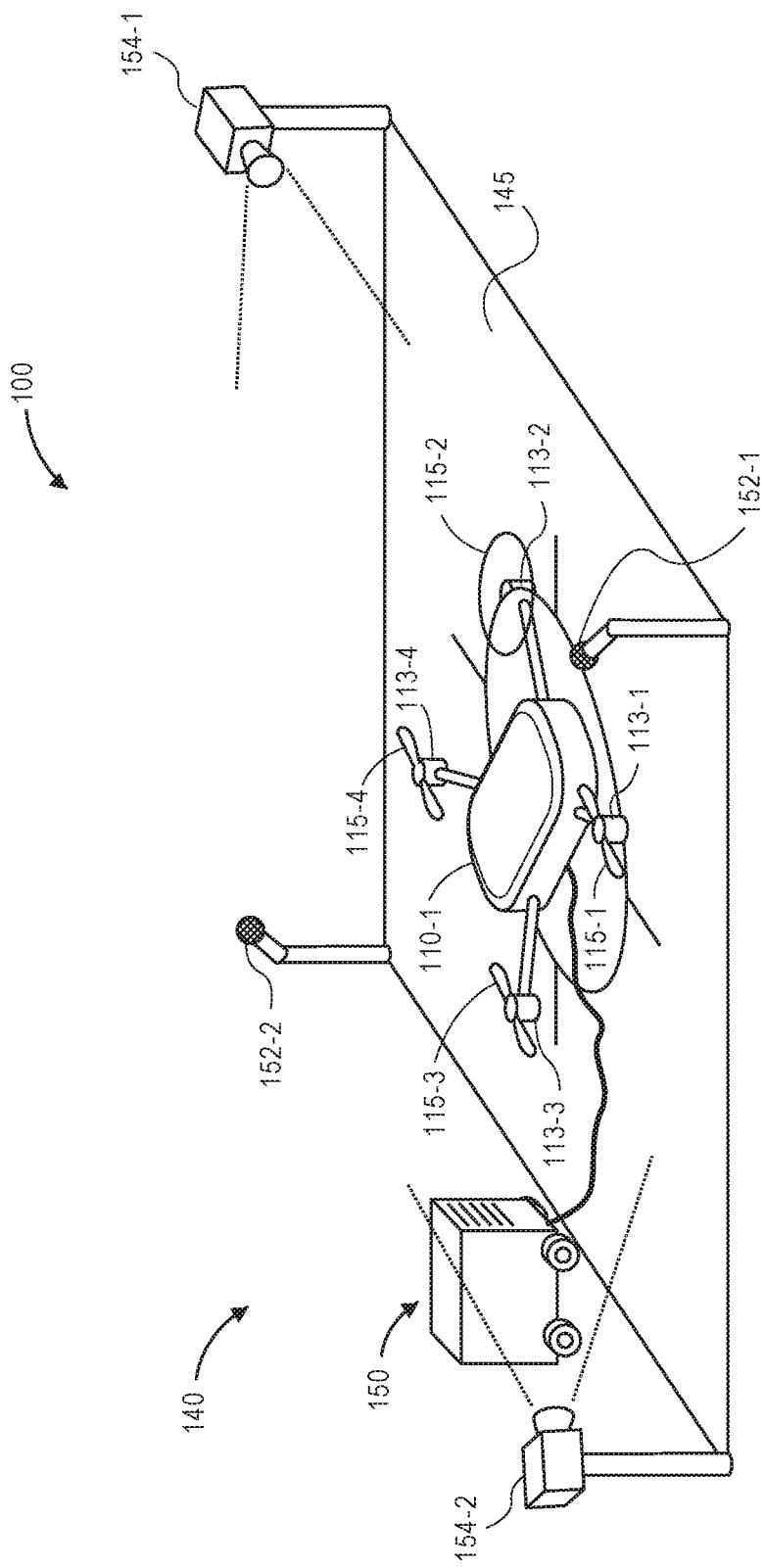
Figure 1B:
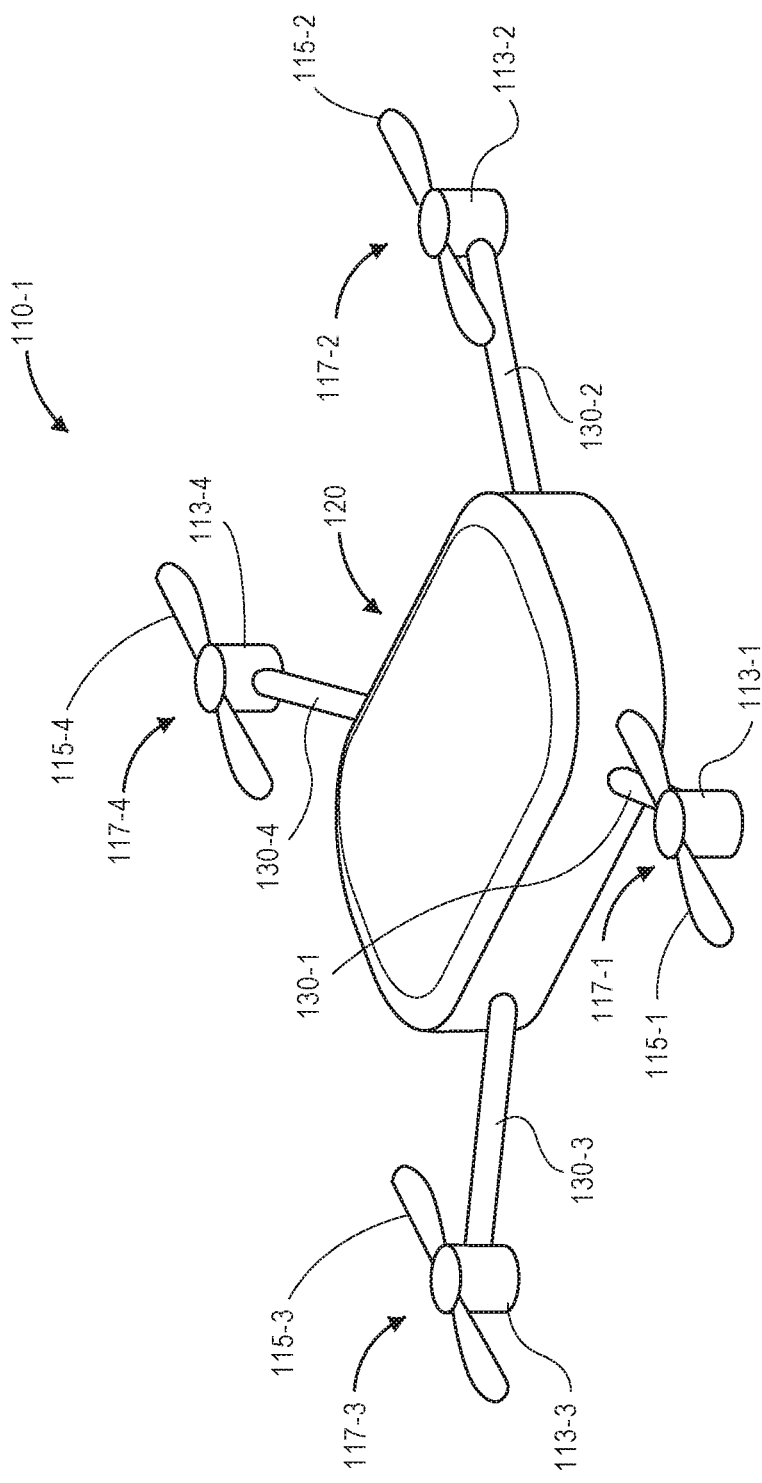

As is set forth in greater detail below, the present disclosure is directed to the automated testing of aerial vehicles, either before an aerial vehicle embarks on one or more missions, or while an aerial vehicle performs one or more missions, based on data captured from the aerial vehicle by one or more sensors provided in a testing facility or aboard the aerial vehicle. More specifically, in some implementations, data captured by sensors provided aboard an aerial vehicle, or sensors within operating ranges of the aerial vehicle at a facility such as a landing area, an operating area, a range, or the like, during testing or operational evolutions of the aerial vehicle may be used to train a machine learning system (e.g., a classifier, an algorithm or another technique), along with data regarding an outcome of the mission. The testing or operational evolutions may involve the actual or simulated operation of any aspect of an aerial vehicle, including but not limited to operating one or more powered elements such as motors, propellers (or rotors), control surfaces, payload engagement systems, landing apparatuses (such as landing gear), or any other systems provided aboard the aerial vehicle, either independently or in concert. The data regarding the outcome of the mission may include an indication as to whether the mission was a success or a failure, or one or more metrics, values or other information regarding the aerial vehicle's performance or operations during the mission, including not only such metrics, values or other information, but rates of change and/or acceleration associated with such metrics, values or other information.

For example, a predetermined testing sequence may call for operating each of the motors aboard an aerial vehicle individually or collectively, or in one or more combinations, and at operating speeds that may be varied gradually or suddenly. Likewise, any control surfaces or other structural components may also be operated individually or collectively, or in any combinations, within predetermined ranges or limits associated with such surfaces or components. Aspects of a payload engagement system (e.g., doors, arms, pulleys, grips, effectors or the like) may also be operated individually or collectively. One or more landing apparatuses (e.g., legs, wheels or other extensions) may also be extended or retracted to varying degrees or positions. Data may be captured during the operation of the powered elements using not only sensors provided on the aerial vehicle, such as gyroscopes, accelerometers, magnetometers, imaging devices or microphones, but also one or more other sensors that are provided at a facility where the testing evolution is performed. The facility may be ground-based, airborne, or provided in any other environment.

After an aerial vehicle has completed a mission, or when the aerial vehicle is otherwise between phases of operation, the aerial vehicle may determine data regarding an outcome of the mission or the one or more phases of operation. The data captured during the testing or operational evolutions and data regarding the outcome of the mission or the phases of operation may be used to train a machine learning system to associate outcomes with testing or operational data. Subsequently, where data is captured during testing or operational evolutions of one or more other aerial vehicles, the data may be provided to the machine learning system as an input, and an outcome of a mission may be predicted based on an output received from the machine learning system. In some embodiments, the machine learning system may be used to predict whether a mission may be performed as scheduled and without restrictions. In some other embodiments, the machine learning system may be used to predict whether the mission should be performed subject to one or more restrictions, or whether the mission should be scrubbed (e.g., canceled) prior to takeoff or aborted in flight, i.e., by returning to an origin or landing at another, alternate destination. In still other embodiments, the machine learning system may be used to predict data regarding outcomes or results of a mission, including but not limited to intrinsic data regarding the electrical, mechanical or other operational performance of an aerial vehicle during the mission.

Referring to FIGS. 1A through 1L, aspects of one system 100 for automated aerial vehicle inspections is shown. The system 100 includes an aerial vehicle 110-1 and a take-off or landing facility 140. The aerial vehicle 110-1 includes a plurality of motors 113-1, 113-2, 113-3, 113-4 and a plurality of rotors 115-1, 115-2, 115-3, 115-4. Each of the motors 113-1, 113-2, 113-3, 113-4 further includes one or more sensors 117-1, 117-2, 117-3, 117-4 for capturing information or data regarding operations of the respective motors 113-1, 113-2, 113-3, 113-4. The aerial vehicle 110-1 further includes a plurality of environmental or operational sensors 120 and a plurality of test sensors 130-1, 130-2, 130-3, 130-4, and may include any number of sensors that are configured to operate in any manner or for any purpose.

The facility 140 includes a landing pad 145, a testing unit 150, and a plurality of sensors aligned within an operating range of the landing pad 145, including a pair of acoustic sensors (e.g., microphones) 152-1, 152-2 and a pair of imaging devices 154-1, 154-2 (e.g., digital cameras). The facility 140 may further include any number of structures (not shown) that may be associated with the take-off, landing, repair, loading, unloading, maintenance or storage of aerial vehicles, or other activities regarding aerial vehicles. The testing unit 150 may be any fixed or mobile system having a number of sensors, sensing assemblies or sensing equipment that may be used to monitor one or more aspects of the aerial vehicle 110-1. For example, the testing unit 150 may include one or more load cells or sensors, torque meters, temperature sensors, vibration sensors, or other components, as well as one or more acoustic sensors and/or imaging devices in addition to the acoustic sensors 152-1, 152-2 and imaging devices 154-1, 154-2. Alternatively, the testing unit 150 may be configured to receive signals from one or more sensors provided aboard aerial vehicles on the landing pad, e.g., the environmental or operational sensors 120 or the test sensors 130-1, 130-2, 130-3, 130-4 aboard the aerial vehicle 110-1.

Each of the acoustic sensors 152-1, 152-2 and imaging devices 154-1, 154-2 is mounted in association with the landing pad 145, e.g., atop one or more stanchions, posts or other structures, and aligned to capture information or data from one or more aerial vehicles departing from the landing pad 145 or returning to the landing pad 145. Alternatively, one or more of the sensors 152-1, 152-2, 154-1, 154-2 provided about the landing pad 145 may be mobile in nature, e.g., on a vehicle or robot that may enter within an operating range of the landing pad 145 to capture information or data regarding the aerial vehicle 110-1, and depart from the operating range of the landing pad 145 after the information or data has been captured, such as to evaluate another aerial vehicle on a different landing pad. In addition to imaging devices and acoustic sensors, the facility 140 may further include any other type or form of other sensors (not shown) for capturing information or data from vehicles at the landing pad 145. The facility 140 and/or the landing pad 145 may be associated with any type or form of other structures or facilities (not shown) associated with missions that are to be performed by one or more aerial vehicles, such as the aerial vehicle 110-1, including but not limited to airborne delivery or surveillance operations.

Figure 1C:
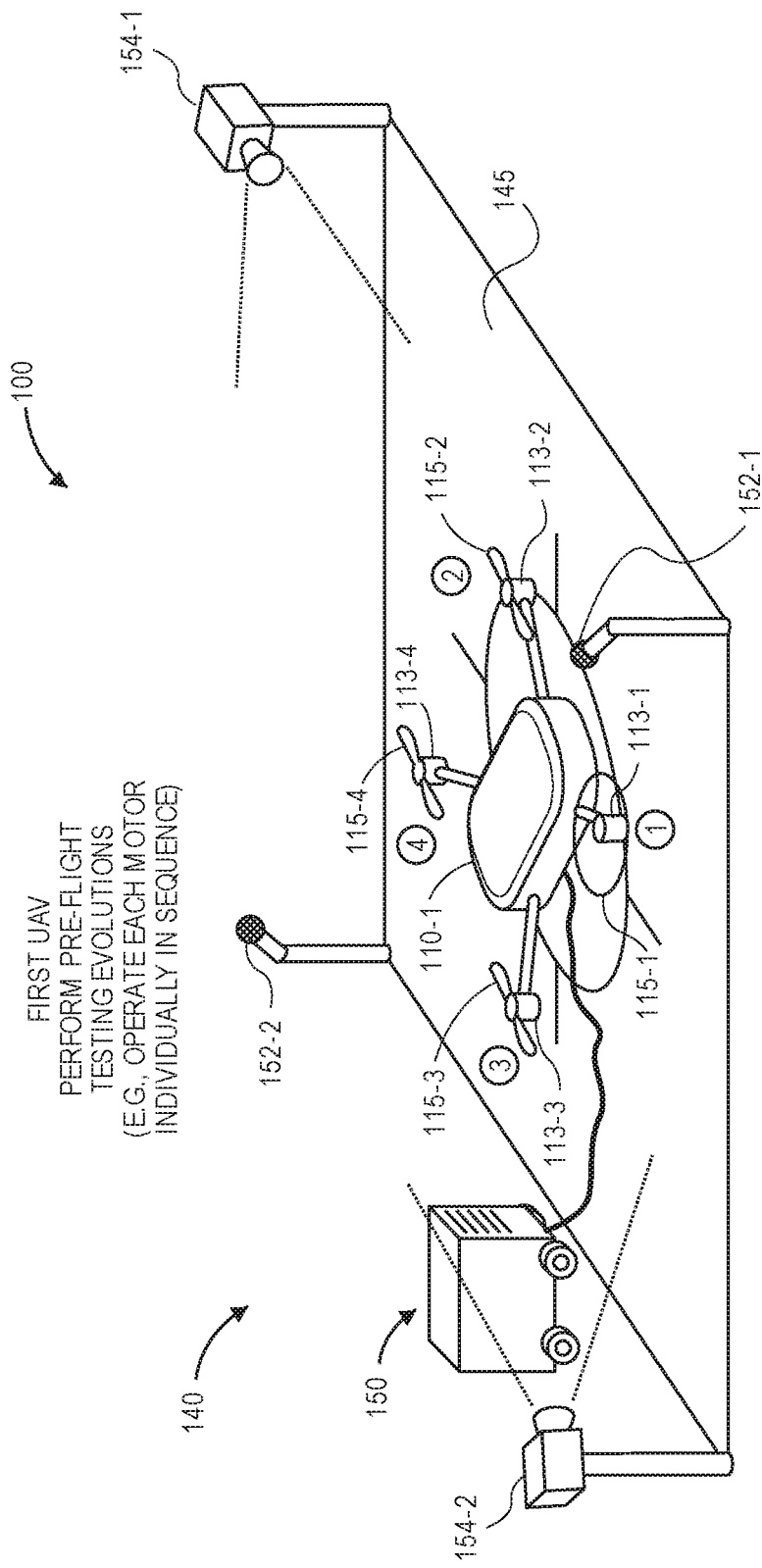

As is shown in FIG. 1C, as the aerial vehicle 110-1 prepares to depart the facility 140 to perform a mission, the aerial vehicle 110-1 may be subjected to any number of automatic testing evolutions within the audible ranges of the acoustic sensors 152-1, 152-2 and the fields of view of the imaging devices 154-1, 154-2, or within the operational ranges of the environmental or operational sensors 120 or the test sensors 130-1, 130-2, 130-3, 130-4. For example, as is shown in FIG. 1C, each of the motors 113-1, 113-2, 113-3, 113-4 may be operated independently and in series, such that acoustic and imaging data may be captured using the acoustic sensors 152-1, 152-2, the imaging devices 154-1, 154-2, the motor sensors 117-1, 117-2, 117-3, 117-4, the environmental or operational sensors 120 or the test sensors 130-1, 130-2, 130-3, 130-4. Alternatively, where the aerial vehicle 110-1 includes one or more control surfaces, e.g., one or more rudders, elevators, stabilizers, spoilers, ailerons, flaps or slats, or other operable components (such as extendible or retractable landing gear or the like), such other surfaces or other components may also be operated in accordance with the testing evolutions. The aerial vehicle 110-1 may further operate one or more payload engagement systems, landing systems, or any other components. Data may be captured by one or more of the environmental or operational sensors 120, one or more of the test sensors 130-1, 130-2, 130-3, one or more sensors associated with the testing unit 150, the acoustic sensors 152-1, 152-2, the imaging devices 154-1, 154-2, or any other sensors (not shown). The data captured by such sensors may represent or describe any aspect of the operation of the aerial vehicle 110-1 during the testing evolutions, e.g., measures of noise or vibrations emitted by the aerial vehicle 110-1, forces supplied or generated by the one or more motors 113-1, 113-2, 113-3, 113-4 at various speeds, electrical properties of the aerial vehicle 110-1 (such as voltage levels, current levels and/or resistances of one or more components of the aerial vehicle 110-1), stresses or strains acting on the aerial vehicle 110-1, operating temperatures of any components of the aerial vehicle 110-1, or any other measures.

Figure 1D:
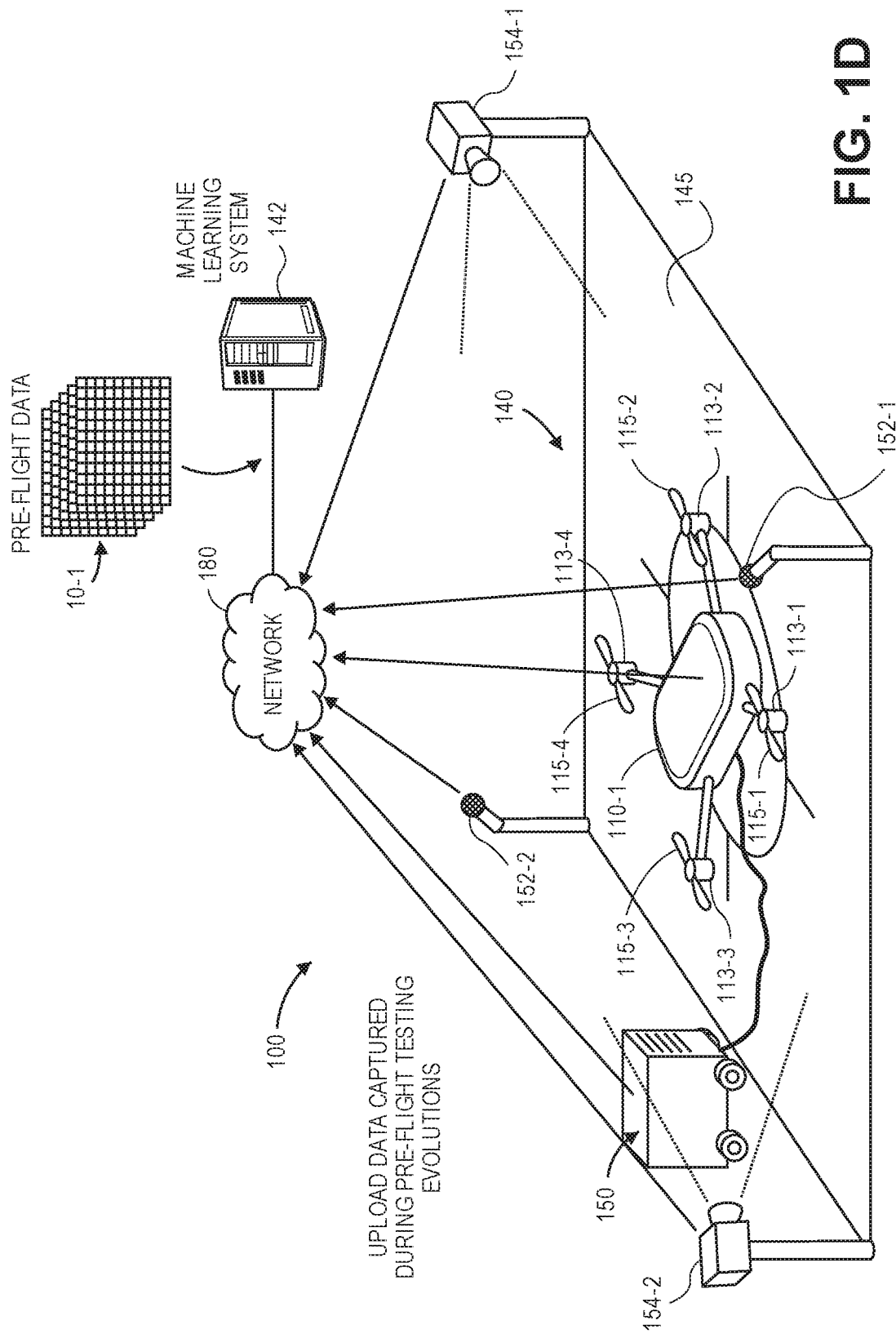

As is shown in FIG. 1D, after the testing evolutions are completed, either in whole or in part, data 10-1 captured by one or more of the onboard sensors 117-1, 117-2, 117-3, 117-4, 120, 130-1, 130-2, 130-3, 130-4 and ground-based sensors 152-1, 152-2, 154-1, 154-2 during the pre-flight testing evolutions may be uploaded to one or more servers 142 associated with the facility 140, e.g., over a network 180, by wireless or wired connections. In some embodiments, data captured by the onboard sensors 117-1, 117-2, 117-3, 117-4, 120, 130-1, 130-2, 130-3, 130-4 may be transmitted directly from the aerial vehicle 110-1 to the servers 142 via the network 180. In some other embodiments, data captured by the onboard sensors 117-1, 117-2, 117-3, 117-4, 120, 130-1, 130-2, 130-3, 130-4 may be provided to the testing unit 150 and transmitted from the testing unit 150 to the servers 142 via the network 180. The servers 142 may be configured to operate one or more machine learning systems, e.g., classifiers, algorithms or techniques. Alternatively, the machine learning systems may be operated by one or more processors or other computer devices provided aboard the aerial vehicle 110-1 or, alternatively, by one or more processors or other computer devices on the testing unit 150.

Figure 1E:
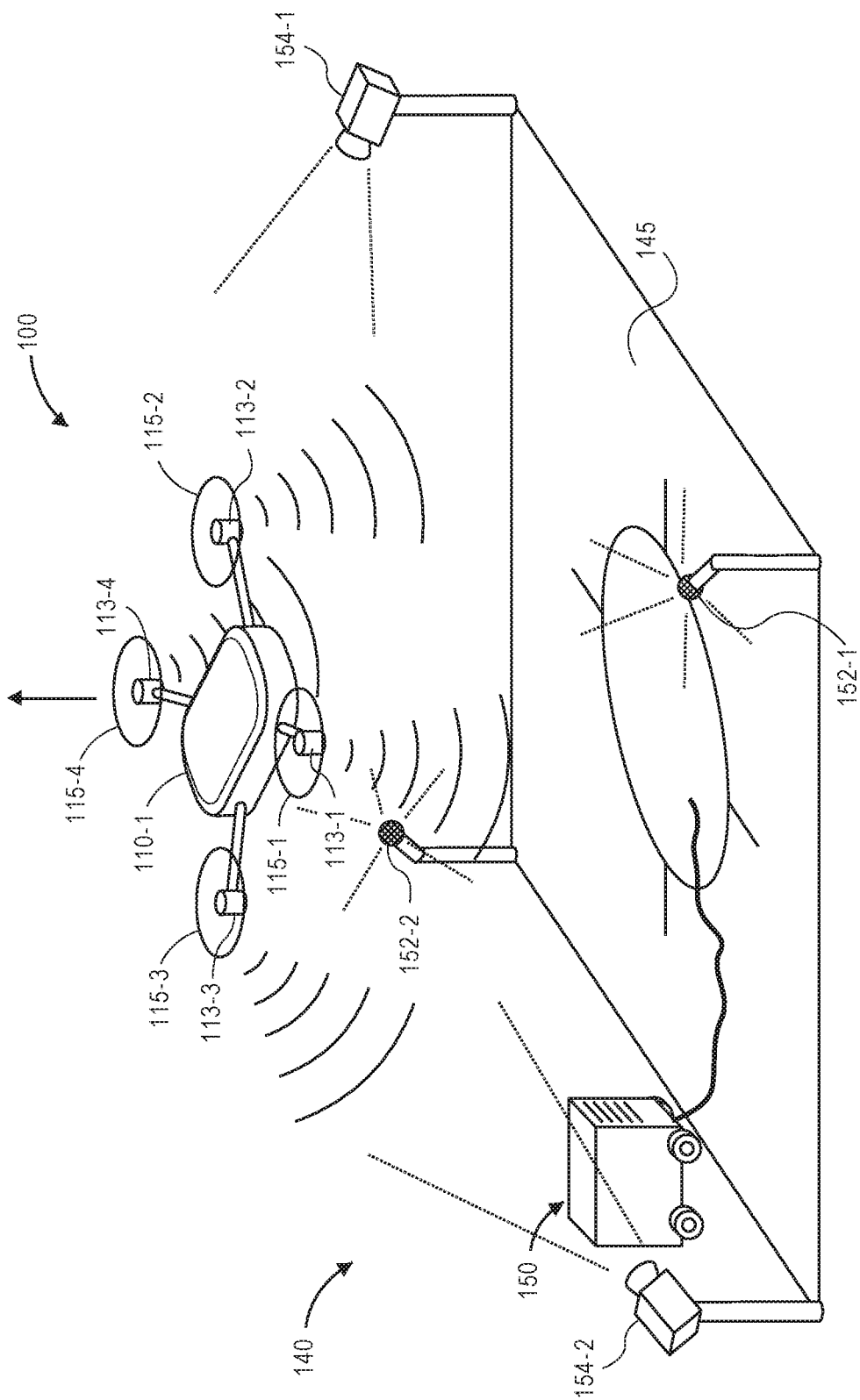
Figure 1F:
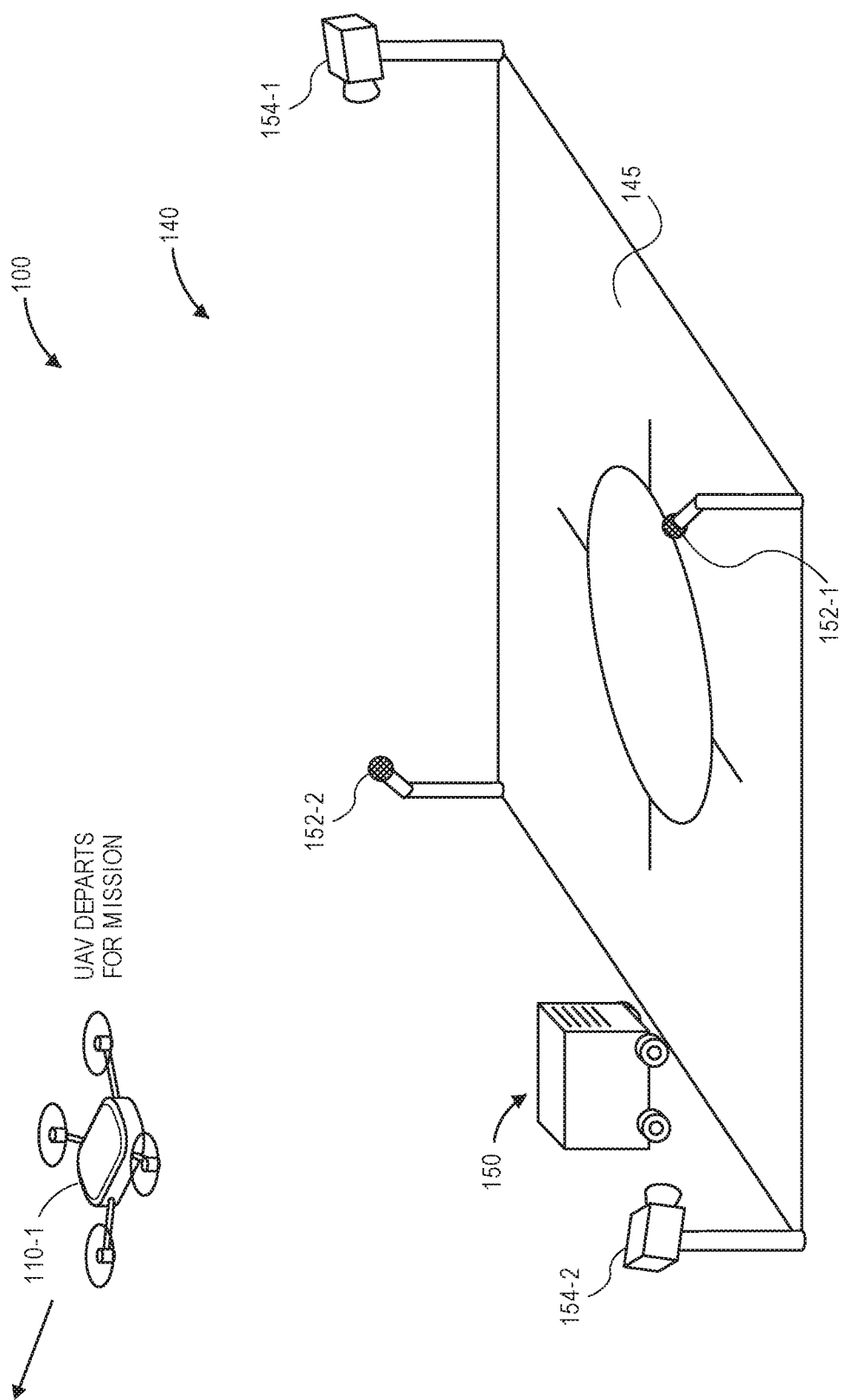

As is shown in FIG. 1E, the aerial vehicle 110-1 may take off from the facility 140, e.g., by operating the one or more propulsion motors 113-1, 113-2, 113-3, 113-4 to generate sufficient lifting forces, thereby causing the aerial vehicle 110-1 to lift up from the landing pad 145. During the take-off operation shown in FIG. 1E, the motor sensors 117-1, 117-2, 117-3, 117-4, the environmental or operational sensors 120 or the test sensors 130-1, 130-2, 130-3, 130-4 aboard the aerial vehicle 110-1, or the acoustic sensors 152-1, 152-2, the imaging devices 154-1, 154-2, at the facility 140, may continue to capture data regarding the performance of the aerial vehicle 110-1, and provide such data to the server 142, e.g., via the network 180. As is shown in FIG. 1F, after clearing the landing pad 145, the aerial vehicle 110-1 may depart from the facility 140 to perform the mission. The data captured by such sensors during the take-off evolution may be of the same type or category as the data 10-1 captured during the pre-flight testing evolutions, or data of a different type or category.

Figure 1G:
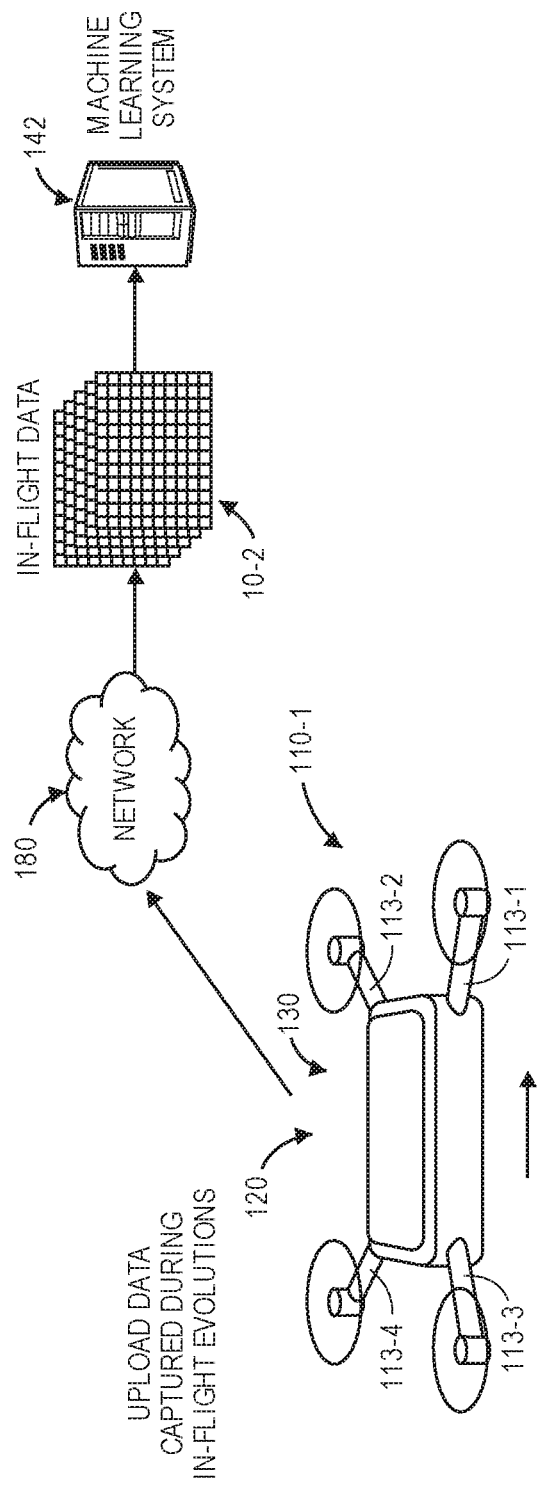

As is shown in FIG. 1G, as the aerial vehicle 110-1 performs the mission, the various sensors aboard the aerial vehicle 110-1, e.g., the motor sensors 117-1, 117-2, 117-3, 117-4, the environmental or operational sensors 120 or the test sensors 130-1, 130-2, 130-3, 130-4, may continue to capture data regarding the performance of the aerial vehicle 110-1, and provide such data 10-2 to the server 142, e.g., via the network 180. Likewise, the data 10-2 captured by such sensors may be of the same type or category as the data 10-1 captured during the pre-flight testing evolutions, or of a different type or category.

Figure 1H:
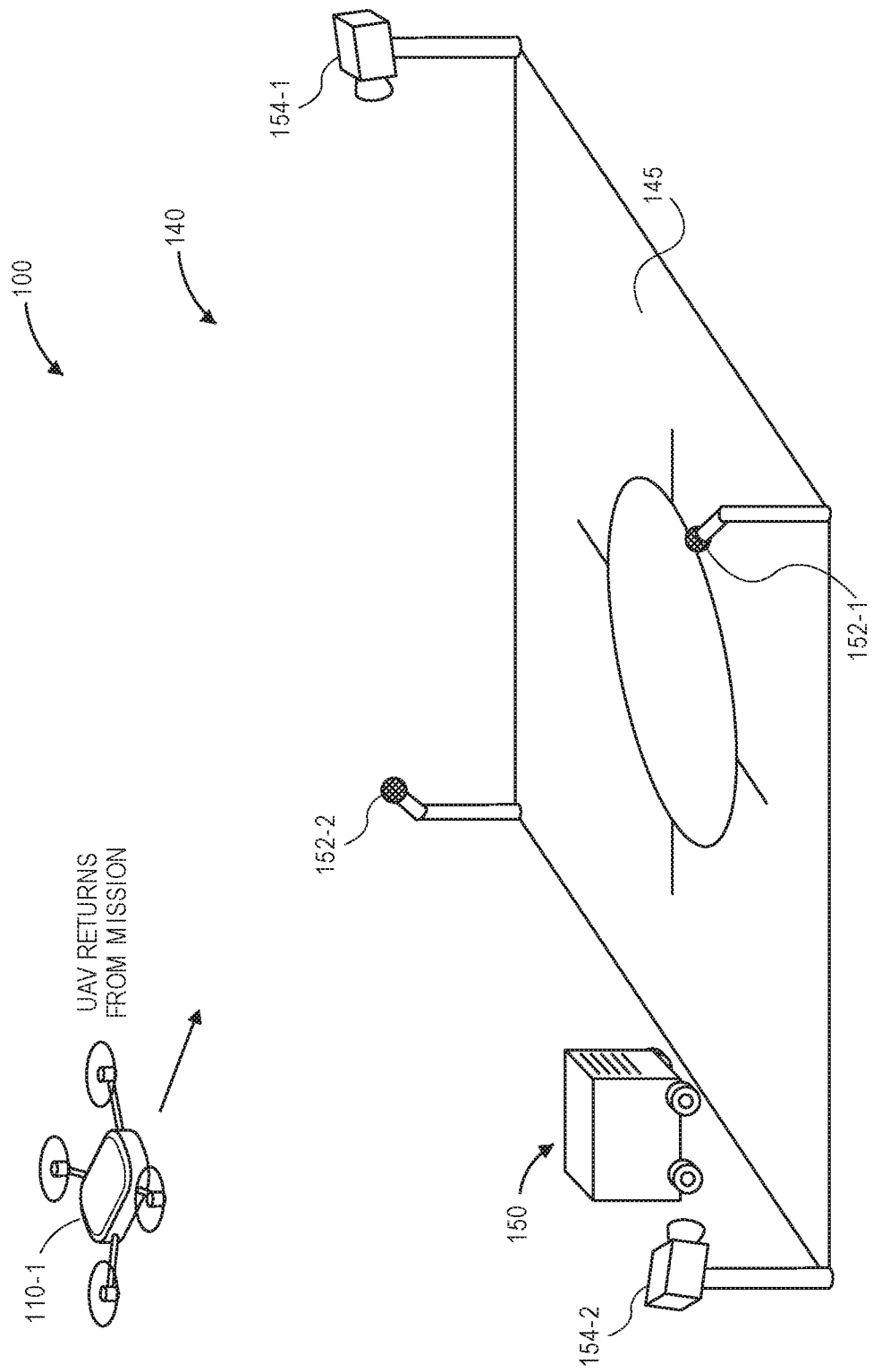
Figure 11:
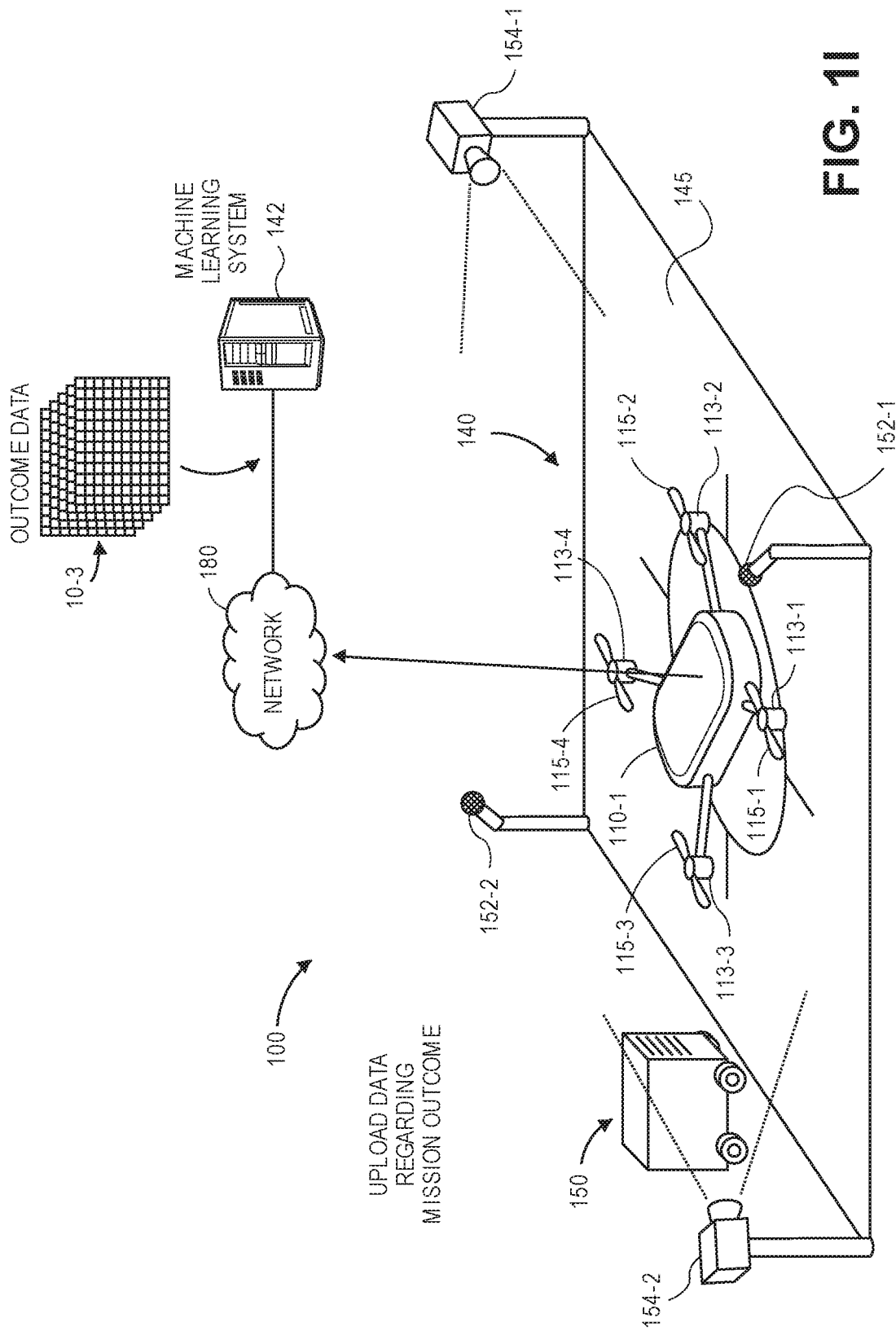

As is shown in FIG. 1H, upon completing the mission, the aerial vehicle 110-1 may return to the facility 140, and land on the landing pad 145. Alternatively, the aerial vehicle 110-1 may land at a different location, e.g., in accordance with the mission, or in response to one or more faults, failures or other conditions or events that might have affected the aerial vehicle 110-1 during the mission. As is shown in FIG. 1I, after the aerial vehicle 110-1 has landed on the landing pad 145, data 10-3 regarding an outcome of the mission may be uploaded to the server 142, e.g., via the network 180. Alternatively, data regarding the outcome of the mission may be regularly (e.g., synchronously or asynchronously) provided to the server 142, e.g., via the network 180, during the performance of the mission, prior to the arrival of the aerial vehicle 110-1.

The data 10-3 regarding the outcome of the mission may indicate whether the aerial vehicle 110-1 was able to complete the mission as planned, without any specific restrictions on its operations. Alternatively, the data 10-3 may identify any modifications to the operation of the aerial vehicle 110-1 that may have been required in order to complete the mission, such as increased or decreased rotating speeds of one or more of the motors 113-1, 113-2, 113-3, 113-4, increased or decreased airspeeds or altitudes, or changes in course that may have been required in order to complete the mission. In some embodiments, the data 10-3 provided to the server 142 may merely include an indication as to whether the mission was completed or aborted. In some other embodiments, the data 10-3 provided to the server 142 may include any operational data or other information captured at regular intervals or continuously, e.g., operating speeds of the motors 113-1, 113-2, 113-3, 113-4, operating temperatures of one or more components aboard the aerial vehicle 110-1, power levels (e.g., voltages, currents and/or resistances) associated with one or more components aboard the aerial vehicle 110-1, or any other data of interest regarding the operation of the aerial vehicle 110-1 during the mission.

Figure 1J:
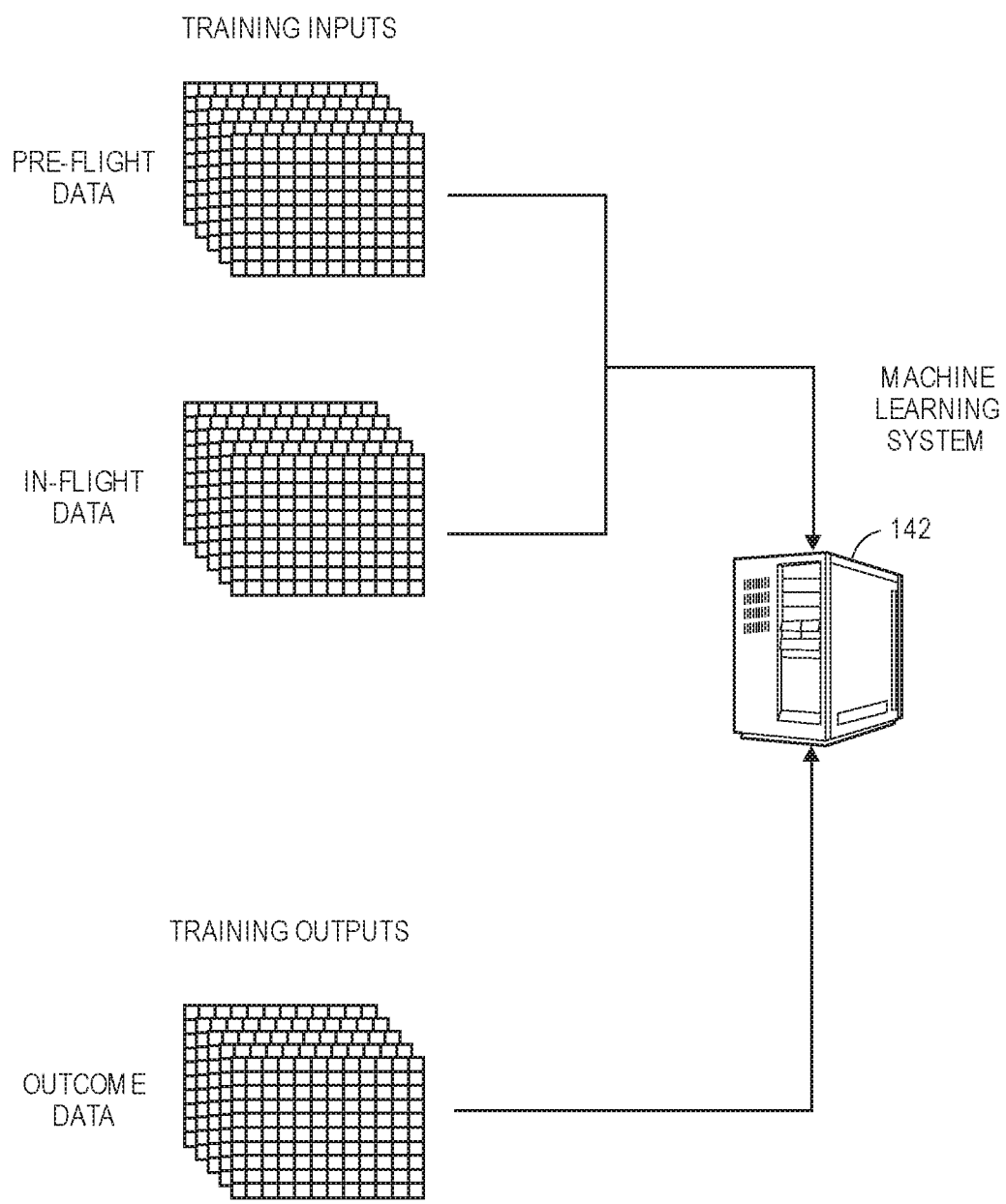

As is shown in FIG. 1J, the various data 10-1, 10-2 captured by the aerial vehicle 110-1 and/or the facility 140 during the pre-flight testing evolutions or the performance of the mission may be provided to the server 142, along with the data 10-3 regarding the outcome of the mission. The data 10-1, 10-2, 10-3 may be used to train a machine learning system operating on the server 142 to recognize or associate the various data captured by sensors aboard aerial vehicles or provided in ground-based or airborne facilities with one or more missions to be performed by the aerial vehicles 110-1, e.g., with the data 10-1, 10-2 being provided to the machine learning system as training inputs, and the data 10-3 being provided as training outputs. Additionally, or alternatively, one or more training inputs may include one or more attributes of the missions, e.g., locations of origins, destinations and/or intervening waypoints, as well as masses of one or more payloads or other aspects or characteristics of the missions, and the machine learning system may be trained to associate data captured by one or more onboard sensors or other sensors and attributes of missions with data regarding outcomes of such missions. In some embodiments, some of the data 10-1, 10-2 may be withheld as a set of test inputs (or validation inputs), and some of the data 10-3 may be withheld as a set of test outputs (or validation outputs), and subsequently provided to the machine learning system in order to determine whether or an extent to which the machine learning system has been properly trained to associate data regarding an aerial vehicle with an outcome of a mission to be performed by the aerial vehicle. Alternatively, the machine learning system may be operated by one or more processors or other computer devices provided aboard the aerial vehicle 110-1 or in any other ground-based or airborne location.

After the machine learning system operating on the server 142 has been properly trained, the machine learning system may receive any type or form of data from one or more sensors provided aboard an aerial vehicle, or at a ground-based or airborne facility, and use such data to determine whether the aerial vehicle is cleared to perform a mission, or whether further inspection or evaluation of the aerial vehicle may be desired or required. Alternatively, the machine learning system may use such data to determine whether an outcome of a mission will be favorable or unfavorable, according to one or more qualitative or quantitative standards. For example, the machine learning system may be trained to provide a binary indication (e.g., success or failure, favorable or unfavorable) or a probability that a mission may be a success or a failure, or that its outcome may be favorable or unfavorable. As yet another alternative, inputs to a machine learning system may include one or more attributes of the mission to be performed.

Figure 1K:
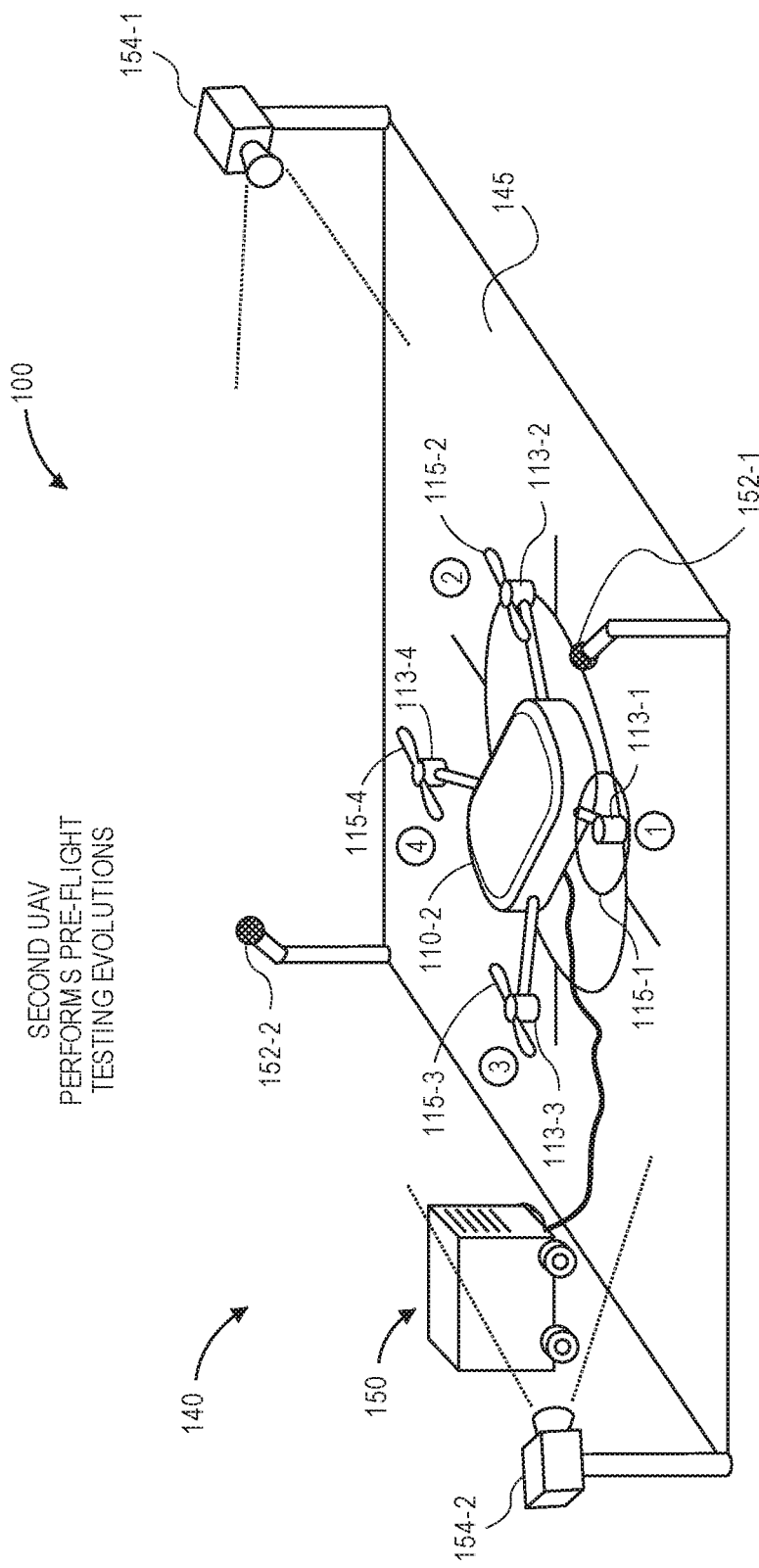

As is shown in FIG. 1K, an aerial vehicle 110-2 may be subjected to any number of automatic testing evolutions within the audible ranges of the acoustic sensors 152-1, 152-2 and the fields of view of the imaging devices 154-1, 154-2 at the facility 140. As is shown in FIG. 1L, data 10-4 may be captured by the one or more sensors 152-1, 152-2, 154-1, 154-2 of the facility 140 or by the various sensors aboard the aerial vehicle 110-2 during the performance of the testing evolutions. In some embodiments, the pre-flight testing evolutions that are performed by the aerial vehicle 110-2 may be the same pre-flight testing evolutions that were performed by the aerial vehicle 110-1, as shown in FIG. 1C, in the same sequence or in a different sequence. In some other embodiments, the pre-flight testing evolutions performed by the aerial vehicle 110-2 may include one or more testing evolutions that are different from the pre-flight testing evolutions that were performed by the aerial vehicle 110-1, as shown in FIG. 1C.

The data 10-4 may be provided to the server 142, e.g., via the network 180, and to the machine learning system operating on the server 142 as an input. An output received from the machine learning system may be used to predict whether the aerial vehicle 110-2 is cleared to perform a mission, e.g., whether the mission will be a success, or whether the aerial vehicle 110-2 should be blocked from performing the mission, e.g., whether the mission will result in failure or be aborted, or any other data regarding an outcome of the mission to be performed by the aerial vehicle 110-2.

Accordingly, the systems and methods of the present disclosure may be utilized to automate the performance of one or more testing evolutions that are performed on aerial vehicles, and to predict or determine a likelihood of success or failure of one or more missions to be subsequently performed by the aerial vehicles, or to predict or determine any metrics, values or other information regarding the mission, and, alternatively, any rates of change and/or acceleration associated with such metrics, values or other information. In particular, such systems and methods may capture data using sensors onboard an aerial vehicle, and ground-based or airborne sensors at a landing area or testing facility, during the performance of one or more pre-flight testing evolutions, or during in-flight operations of the aerial vehicle. Such sensors may include one or more acoustic sensors, imaging devices, gyroscopes, accelerometers, magnetometers, load cells or other sensors, stress or strain gages, electrical sensors, tachometers (e.g., acoustic sensors, optical sensors or other sensors for determining a rotating speed of one or more components), thermometers, or any other sensors provided on the aerial vehicle or at the testing facility. The data captured by such sensors during the performance of one or more missions and, alternatively, attributes of such missions may, along with data regarding outcomes of such missions, be used to train a machine learning system to associate data regarding the operation of the aerial vehicle (e.g., during pre-flight or in-flight evolutions) and, alternatively, attributes of such missions, with data regarding an outcome of a mission. In particular, the machine learning system may be trained to generate an indication of a probability or a likelihood of success of a mission, a specific instruction or command to participate or not participate in the mission, or one or more metrics, values or other information associated with the operation of the aerial vehicle during the performance of the mission. Alternatively, where data is captured during the performance of the mission, a machine learning system may be trained to generate an indication of a probability or a likelihood of success of the mission, or a specific instruction or command to return to an origin, to land, or to take any other action based on data captured thereby. The machine learning systems may be operated by one or more servers or other machines provided in a physical location or "cloud"-based environment or, alternatively, aboard the aerial vehicle.

Subsequently, when an aerial vehicle prepares to perform a mission, data captured by one or more sensors provided aboard the aerial vehicle or at a testing facility may be provided to the trained machine learning system as inputs, and a probability or a likelihood of success of the mission to be performed, or an instruction or command to participate or not participate in the mission, may be determined based on an output received from the trained machine learning system.

Aerial vehicles are typically evaluated from time to time to check for failures or deficiencies in materials and components. Because aerial vehicles commonly radiate noise and/or other vibrations in response to thrust or lift forces, flow conditions, impacts or other adverse events, aerial vehicles must be routinely tested to properly assess risks of failure of a specific component, of the aerial vehicle as a whole, or of aerial vehicles in a fleet. Whether conditions or deficiencies exist on an aerial vehicle may be assessed with respect to structural components, control surfaces, motors, propellers or appurtenances such as landing gear by performing one or more testing evolutions.

The systems and methods of the present disclosure may be utilized in determining a probability or a likelihood of success or failure of a mission based on any data captured during any type or form of testing evolution. For example, in some embodiments, the testing evolutions may be used to determine a version or release of one or more software systems operating on an aerial vehicle, and to predict an impact on the performance of a mission if an aerial vehicle is not programmed with a most appropriate version or release of a software application or firmware. For example, one or more of such evolutions may determine whether a version or release of a software application or firmware provided on one or more motors, imaging devices or other components of an aerial vehicle is the most up-to-date or appropriate version or release for the components of the aerial vehicle.

In some embodiments, the testing evolutions may be used to determine a level of brightness or intensity, exposure time, focal length, or other property or attribute of an imaging device, and the capacity or sufficiency of the imaging device to perform the one or more functions or application during a mission. For example, one or more of such evolutions may determine whether a visual imaging device, a depth imaging device, or any other type or form of imaging device may detect the presence of one or more persons, animals, objects, fiducial markings or other aspects that may be expected to be encountered within an environment during the mission, or whether such devices may be automatically reconfigured to detect such persons, animals, objects, fiducial markings or other aspects within imaging data captured thereby.

In some embodiments, the testing evolutions may be used to verify the integrity of one or more onboard avionics systems, and to determine whether a mission may be adequately performed with the avionics systems in their current status. For example, the testing evolutions may involve an initial verification of performance conditions, e.g., with or without propellers mounted to the propulsion motors, and reviewing previous operating logs aboard the aerial vehicle. The testing evolutions may further include testing of electromagnetic compatibility of the respective systems, or their operability or the sustainability in response to electromagnetic interference, and to confirming the operation of the power and/or propulsion systems from an initial activation through the ultimate generation of lift and/or thrust thereby. In some such evolutions, the aerial vehicle may be powered on, and control of the aerial vehicle taken through manual or automated testing procedures. One or more telemetry checks (e.g., voltage, current, temperature, operating speed, or other tests) on the propulsion motors and other systems may be performed, until the propulsion motors are confirmed to rotate in their respectively required directions and at commanded speeds, within one or more bands, thresholds or tolerances.

In some embodiments, the testing evolutions may verify that one or more servo systems aboard an aerial vehicle are properly calibrated and operable in response to one or more commands. For example, the aerial vehicle may be powered on, and control of the aerial vehicle taken through manual or automated testing procedures. One or more control signals may be provided to each of the servo systems, and responses of the servo systems to such control signals may be observed. For example, elapsed times between the transmission of the control signals and the responses of the servo systems may be determined. Additionally, the extent of angular, linear or other deflections or motion by the servo systems in response to such control signals may also be determined. The servo systems may be manually or automatically modified or adjusted in response to such evolutions.

In some embodiments, the testing evolutions may verify the operability of any wireless communications systems aboard the aerial vehicle. For example, the aerial vehicle may be powered on, and the electrical integrity of such systems may be determined (e.g., connectivity, voltage checks, current checks, resistance checks, or other verifications while varying the attenuation of radiofrequency signals transmitted thereby by a predetermined extent. The communications systems may also verify that such communications systems may operate at sufficient ranges or with sufficient data quality or integrity. Additionally, whether each of the sensors provided aboard the aerial vehicle is appropriately transmitting data aboard one or more bus lines or systems may also be determined.

In some embodiments, the testing evolutions may determine the reliability of one or more control surfaces to one or more environmental conditions, or to confirm the proper operation of the control surfaces following a software application and/or firmware upgrade or hardware maintenance. For example, the weight and balance of the aerial vehicle may be checked and confirmed, and the inertial navigation systems aboard the aerial vehicle may be calibrated. The aerial vehicle may be tethered or otherwise bound to one or more structures within a testing facility, and one or more of the propellers may be removed (as desired). In some evolutions, pressure may be supplied to a pressure probe, in order to induce an airspeed measurement by the sensor system, and one or more control surfaces or other aspects of the aerial vehicle (e.g., spoilers) may be observed during the performance of one or more maneuvering operations. The aerial vehicle may then be commanded to simulate the changing of course or altitude, e.g., by performing one or more rolls, yaws, or changes in pitch, during one or more simulated environmental conditions.

In some embodiments, the testing evolutions may determine whether sensor instrumentation is properly mounted and coupled to one or more control systems, and providing accurate and reliable data. For example, the aerial vehicle may be mounted within a testing facility, and powered on, and control of the aerial vehicle taken through manual or automated testing procedures. A vehicle's actual, physical orientation may be compared to data provided by one or more sensors aboard the aerial vehicle, including but not limited to a heading or course of the vehicle, a yaw angle of the aerial vehicle, a pitch angle of the aerial vehicle or a roll angle of the aerial vehicle.

In some embodiments, the testing evolutions may determine whether telemetry data is being transmitted by an aerial vehicle at sufficient times and with sufficient data or frequency. For example, the aerial vehicle may be powered on, and control of the aerial vehicle taken through manual or automated testing procedures. Telemetry data regarding the various motors, servos, control surfaces, control systems, power cells (e.g., batteries), positioning systems (e.g., Global Positioning System sensors) may be monitored to determine whether wireless communications between the aerial vehicle and one or more other ground-based or airborne systems is adequate.

In some embodiments, the testing evolutions may determine whether any payload engagement systems provided aboard an aerial vehicle are operating effectively. For example, the aerial vehicle may be powered on, and control of the aerial vehicle taken through manual or automated testing procedures. Power flow (e.g., currents) to various servos for operating payload engagement doors or effectors may be monitored, and such doors and effectors may be operated to various extents, e.g., to confirm that the doors or effectors are operating properly and to any desired extents in response to one or more control signals.

In some embodiments, the testing evolutions may determine whether any safety systems aboard an aerial vehicle are operating effectively. For example, the aerial vehicle may be equipped with one or more systems for taking control of the aerial vehicle in the event of a loss of power, connectivity or control. In some embodiments, the aerial vehicle may be equipped with an automated system for automatically deflecting one or more control surfaces (e.g., elevators, stabilizers, spoilers, ailerons, flaps or slats) under auxiliary power, to cause the aerial vehicle to safely land or travel to a safe point. For example, the aerial vehicle may be powered on, and control of the aerial vehicle taken through manual or automated testing procedures. Subsequently, power may be removed from the aerial vehicle, and the deflection or operation of one or more of the control surfaces in response to the simulated loss of power may be determined.

In some embodiments, the testing evolutions may simulate the effects of a mission on a battery, a power cell or other power system. For example, the aerial vehicle may be powered on, and control of the aerial vehicle taken through manual or automated testing procedures. One or more telemetry checks (e.g., voltage, current, temperature, operating speed, or other tests) may be performed, and the aerial vehicle may be tethered or otherwise bound to one or more structures within a testing facility. The propulsion motors may be operated to one or more operating speeds, and various attributes of the battery, the power cell or the other power systems aboard the aerial vehicle may be determined (e.g., start-up currents, effects on output voltage, operating temperatures, or the like) during various stages of the simulation of the mission. In some embodiments, the propellers may be removed from the propulsion motors prior to simulating the performance of the mission.

In some embodiments, the testing evolutions may determine a level of noise emitted or radiated by one or more components of an aerial vehicle during various phases of operation. For example, the aerial vehicle may be powered on, and control of the aerial vehicle taken through manual or automated testing procedures. One or more telemetry checks (e.g., voltage, current, temperature, operating speed, or other tests) on may be performed, and the aerial vehicle may be tethered or otherwise bound to one or more structures within a testing facility. The propulsion motors of the aerial vehicle may be operated at various rotating speeds and in combination with one another (e.g., one, two, three or four of the propulsion motors of a quad-copter, or an aerial vehicle outfitted with four propulsion motors, may be operated separately or in concert with one another). One or more acoustic sensors, vibration sensors or imaging devices may be configured to capture data regarding emitted or radiated noises or vibrations of the aerial vehicle during various operating conditions. Information regarding such noises or vibrations may be used to predict noises that will be emitted or radiated by the aerial vehicle during one or more missions.

Data may be captured during the performance of the one or more testing evolutions by one or more sensors provided aboard an aerial vehicle or in a testing facility. The captured data may be used to train a machine learning system (e.g., a classifier, an algorithm or a technique) to associate such data with one or more outcomes of missions. For example, the machine learning system may be trained to predict impacts on the performance of a mission given the operating status of its one or more onboard software applications, firmware, imaging devices, avionics systems, servo systems, communications systems, other sensors, batteries or power systems, positioning systems, safety systems, or the like. The machine learning system may be trained using captured data exclusively or, alternatively, along with attributes of the one or more missions. Additionally, or alternatively, data may be captured during operating evolutions, e.g., during the performance of a mission, by one or more airborne or ground-based sensors.

Once the machine learning system has been adequately trained, data captured during the operation of an aerial vehicle, either in one or more pre-flight testing evolutions, or in one or more in-flight evolutions, may be provided to the machine learning system as inputs. For example, in some embodiments, one or more of the testing evolutions described herein may also be performed while an aerial vehicle is operating, e.g., as an operational evolution, and data captured during such evolutions may be provided to the machine learning system as inputs.

One or more outputs received from the machine learning system may be processed or interpreted to determine data regarding an outcome of a mission, e.g., whether the aerial vehicle may embark upon the mission, or continue with the mission. Alternatively, the outputs may be processed or interpreted to determine whether a mission should be scrubbed, or whether the aerial vehicle should be blocked from performing any missions, until further inspections or evaluations are conducted. In some embodiments, the data may be defined according to one or more qualitative or quantitative standards. For example, the machine learning system may be trained to provide a binary indication (e.g., success or failure, favorable or unfavorable) or a probability that a mission may be a success or a failure, or that its outcome may be favorable or unfavorable. Alternatively, the data may include one or more measures relating to the performance of the aerial vehicle during the mission, including but not limited to one or more metrics, values or other information regarding the mission, or any rates of change and/or acceleration associated with such metrics, values or other information.

In accordance with some embodiments of the present disclosure, an aerial vehicle may be outfitted with a number of sensors for aiding in flight control or guidance, including but not limited to one or more Global Positioning System (GPS) sensors, accelerometers, gyroscopes, magnetometers, acoustic sensors or imaging devices. Likewise, a ground-based or airborne testing facility may further include stationary or mobile sensors, including one or more high quality acoustic sensors (e.g., high fidelity microphones), one or more imaging devices (e.g., high frame rate cameras), or any other sensors such as gyroscopes, accelerometers, magnetometers or other sensors. The airworthiness of the aerial vehicle may be evaluated using information or data captured using such sensors, e.g., by providing the information or data to a machine learning system that is trained to determine or predict whether the aerial vehicle may proceed with a mission, or otherwise evaluate the integrity of the aerial vehicle based on the information or data.

The systems and methods disclosed herein may determine whether aerial vehicles are capable of performing a mission, or whether further inspections or evaluations are required, based on information or data captured during any phases of operation of the aerial vehicle. For example, an aerial vehicle may be configured to capture and store a variety of information or data that is generated or encountered during flight. Such information or data may include, but is not limited to, extrinsic information or data, e.g., information or data not directly relating to the aerial vehicle, such as environmental conditions (e.g., temperatures, pressures, humidities, wind speeds and directions), times of day or days of a week, month or year when an aerial vehicle is operating, measures of cloud coverage, sunshine, or surface conditions or textures (e.g., whether surfaces are wet, dry, covered with sand or snow or have any other texture) within a given environment. Such information or data may also include intrinsic information or data, e.g., information or data relating to the aerial vehicle itself, such as operational characteristics (e.g., dynamic attributes such as altitudes, courses, speeds, rates of climb or descent, turn rates, or accelerations; or physical attributes such as dimensions of structures or frames, numbers of propellers or motors, operating speeds of such motors) or tracked positions (e.g., latitudes and/or longitudes) of the aerial vehicles when the information or data is generated or encountered.

In some embodiments, in a training phase or mode, a machine learning system, or one or more computing devices or machines on which the system resides or operates, may receive data regarding the operation of an aerial vehicle, e.g., data captured using one or more onboard sensors, ground-based or airborne sensors, during one or more pre-flight testing evolutions or one or more in-flight evolutions. In some embodiments, where a testing sequence is defined for an aerial vehicle (e.g., a testing sequence associated with each of a plurality of aerial vehicles in a class, or a customized aerial vehicle), in which one or more of the powered elements or components of the aerial vehicle may be operated individually or in tandem, the testing sequence may be performed for an initial or trial run, or for a follow-up run (e.g., prior to a mission of one or more of the vehicles in a class), and data regarding sounds or other relevant factors observed during the initial or trial run may be captured from the aerial vehicle. The data captured during the evolutions may be provided to a machine learning system as training inputs, and data regarding an outcome of a mission executed by the aerial vehicle may be provided to the machine learning system as a training output. In some embodiments, the training inputs may include one or more attributes of the missions. The data regarding the outcome may indicate whether the mission was completed satisfactorily and without restrictions, or subject to one or more restrictions (e.g., reduced power, speed or other limitations), or, alternatively, whether the mission was not completed (e.g., whether the mission was scrubbed or aborted). The data regarding the outcome may further include one or more measures relating to the performance of the aerial vehicle during the mission.

Next, after the machine learning system has been trained to associate operational or testing data captured from or by one or more aerial vehicles (e.g., by one or more sensors provided on the aerial vehicles or at a testing facility), additionally or alternatively along with one or more attributes of missions being performed by the aerial vehicles, with data regarding outcomes of such missions, the machine learning system may receive data regarding operations or testing of one or more other aerial vehicles during a testing sequence, or during one or more missions. For example, a machine learning system may receive operational data regarding an aerial vehicle such as courses, speeds, payloads carried, operating runtimes and the like during a mission, and also noises or other vibrations radiated therefrom during the mission, that is captured by one or more onboard sensors, as well as testing data regarding the aerial vehicle captured by the one or more onboard sensors and one or more ground-based or airborne sensors prior to the mission. The operational data and the testing data may be provided to the machine learning system as inputs, and whether the data, individually or collectively, suggests that the aerial vehicle may complete a mission as scheduled, or whether the aerial vehicle requires any type or form of maintenance, repairs or further inspections.

Those of ordinary skill in the pertinent arts will recognize that any type or form of machine learning system (e.g., hardware and/or software components or modules) may be utilized in accordance with the present disclosure. For example, information or data captured during testing or operation using onboard sensors or ground-based or airborne sensors may be processed and interpreted according to one or more machine learning systems (or algorithms or techniques) including but not limited to nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses. Using any of the foregoing algorithms or techniques, or any other algorithms or techniques, information or data regarding the safety or integrity of one or more aerial vehicles, or maintenance, repairs or further inspections required by such vehicles, may be determined.

For example, all data (e.g., acoustic data, imaging data, magnetic data, acceleration data, orientation data, or any other relevant data regarding vibrations experienced during testing or operation) that falls within a predefined threshold or proximity may be placed in or associated with a common cluster or group for a given intensity or frequency of the observed data, or a given level or spectrum of the observed data. Such clusters or groups may be defined for an entire set of such data, or, alternatively, among a subset, or a training set, of such data, and extrapolated among the remaining data. Similarly, clusters or groups of characteristics may be defined and associated with aerial vehicles or structural conditions based on co-occurrence frequencies, correlation measurements or any other associations of the characteristics with such vehicles or conditions.

Those of ordinary skill in the pertinent arts will recognize that any type or form of aerial vehicle may be evaluated by one or more of the systems disclosed herein, or in accordance with one or more of the methods disclosed herein, including but not limited to fixed-wing or rotating-wing aircraft. Moreover, such evaluations may be conducted while the aerial vehicle is performed or being subjected to one or more other tasks. For example, data may be captured from an aerial vehicle performing a predetermined testing sequence, e.g., operating each of the motors, propellers, control surfaces, payload engagement systems and/or landing apparatuses of the aerial vehicle independently or in tandem, while the aerial vehicle is being loaded with a new payload or otherwise being prepared to perform a new mission. If the data indicates that no maintenance, repairs or further inspections are required, the aerial vehicle may be cleared to perform the new mission at the earliest opportunity. If the data indicates that maintenance, repairs or further inspections may be needed, however, the aerial vehicle may be blocked from the new mission until any faults have been identified and addressed. Additionally, such evaluations may also be conducted while an aerial vehicle is traveling, e.g., across a range or over or near a predetermined point, or performing any other functions. Moreover, data captured during operations or testing may be subjected to processing (e.g., one or more modal analyses of such data) in real time, in near-real time, or in one or more batch processes in accordance with the present disclosure.

Figure 2:
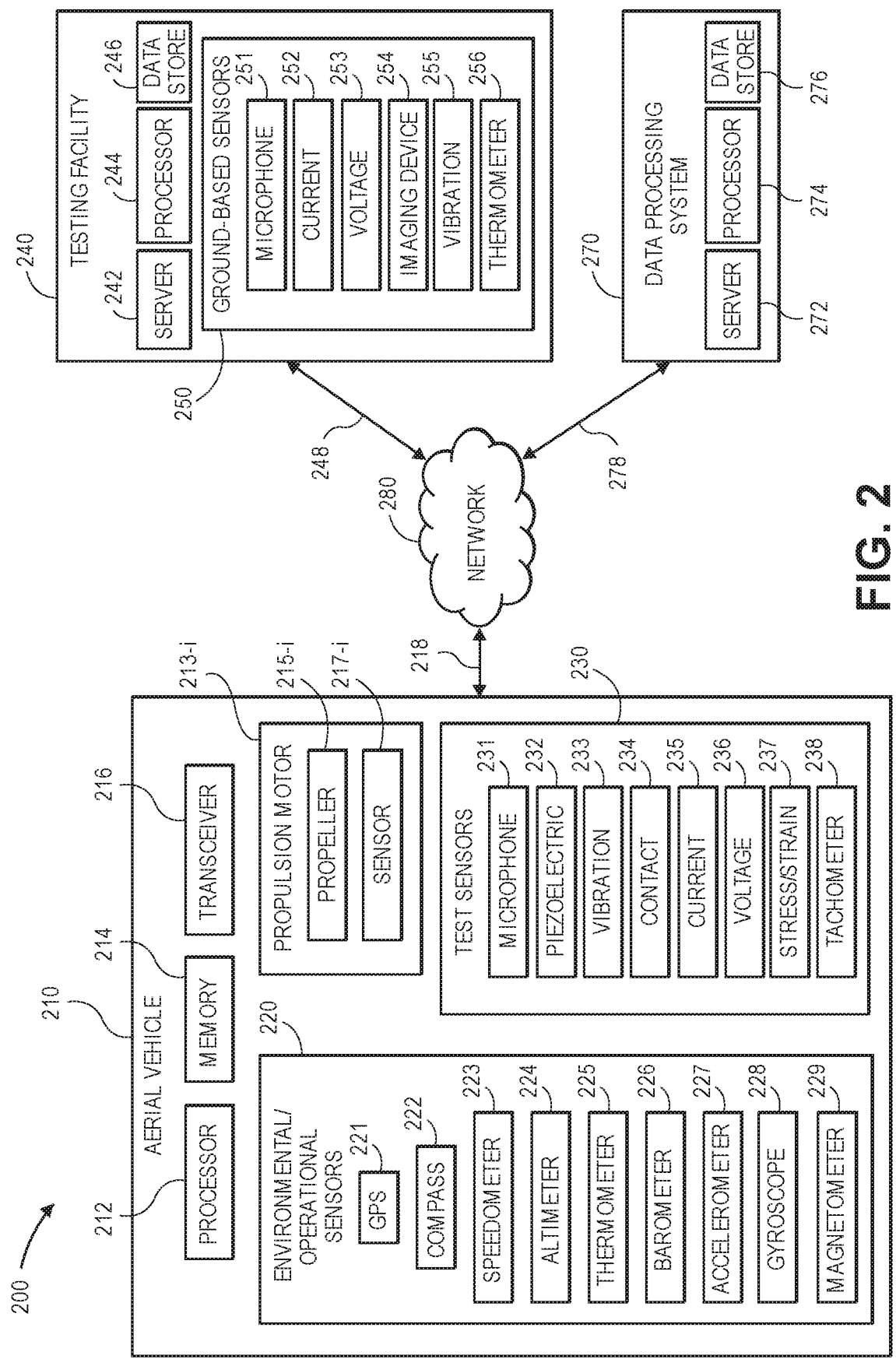
FIG. 2 is a block diagram of one system for automated pre-flight or in-flight testing of aerial vehicles in accordance with embodiments of the present disclosure.

Referring to FIG. 2, a block diagram of components of one system 200 for automated pre-flight or in-flight testing of aerial vehicles in accordance with embodiments of the present disclosure is shown. The system 200 of FIG. 2 includes an aerial vehicle 210, a testing facility 240 and a data processing system 270 connected to one another over a network 280. Except where otherwise noted, reference numerals preceded by the number "2" shown in the block diagram of FIG. 2 indicate components or features that are similar to components or features having reference numerals preceded by the number "1" shown in FIGS. 1A through 1L.

The aerial vehicle 210 includes a processor 212, a memory 214 and a transceiver 216, one or more propulsion motors 213-$i$, as well as a plurality of environmental or operational sensors 220 and a plurality of test sensors 230.

The processor 212 may be configured to perform any type or form of computing function, including but not limited to the execution of one or more analytical functions or machine learning algorithms or techniques. For example, the processor 212 may control any aspects of the operation of the aerial vehicle 210 and the one or more computer-based components thereon, including but not limited to the transceiver 216, the environmental or operational sensors 220, and/or the test sensors 230. The aerial vehicle 210 may likewise include one or more control systems (not shown) that may generate instructions or commands for conducting operations thereof, e.g., for operating one or more rotors, motors, rudders, ailerons, flaps or other components provided thereon. Such control systems may be associated with one or more other computing devices or machines, and may communicate with the testing facility 240 and/or the data processing system 270 or one or more other computer devices (not shown) over the network 280, through the sending and receiving of digital data. The aerial vehicle 210 further includes one or more memory or storage components 214 for storing any type of information or data, e.g., instructions or commands for operating the aerial vehicle, or information or data captured by one or more of the environmental or operational sensors 220 and/or the test sensors 230.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 280 or directly.

The propulsion motors 213-i may be any type or form of motor (e.g., electric, gasoline-powered or any other type of motor) capable of generating sufficient rotational speeds of one or more propellers 215-i or other components to provide lift and/or thrust forces to the aerial vehicle 210 and any payload engaged thereby, to aerially transport the engaged payload thereby. For example, one or more of the propulsion motors 213-i may be a brushless direct current (DC) motor such as an outrunner brushless motor or an inrunner brushless motor.

The aerial vehicle 210 may include any number of such propulsion motors 213-i of any kind. For example, one or more of the propulsion motors 213-i may be aligned or configured to provide forces of lift to the aerial vehicle 210, exclusively, while one or more of the propulsion motors 213-i may be aligned or configured to provide forces of thrust to the aerial vehicle 210, exclusively. Alternatively, one or more of the propulsion motors 213-i may be aligned or configured to provide forces of lift and forces of thrust to the aerial vehicle 210, as needed. For example, the propulsion motors 213-i may be fixed in their orientation on the aerial vehicle 210, or configured to vary their respective orientations, e.g., a tilt-rotor aircraft. Moreover, the propulsion motors 213-i may be aligned or configured to operate with different capacities or ratings, or at different speeds, or coupled to propellers having different sizes and shapes.

Each of the propulsion motors 213-i may be coupled to one or more propellers 215-i (or rotors or rotatable systems) having a plurality of shaped blades joined to a hub or boss. For example, each of such propellers may be rotatably mounted to a mast or shaft associated with a respective one of the propulsion motors 213-i and configured to generate forces of lift or thrust when rotated within a fluid. Each of such propellers 215-i may include any number of blades, and may be fixed pitch, adjustable pitch or variable pitch in nature. Moreover, one or more of such propellers 215-i may be banded or shielded in any manner. In some embodiments, one or more of the propellers 215-i may be configured to rotate about a vertical axis, and to provide forces of lift in a vertical direction (e.g., upward) accordingly. In some other embodiments, one or more of the propellers 215-i may be configured to rotate about a horizontal axis, and to provide forces of thrust in a horizontal direction (e.g., forward) accordingly. In still other embodiments, one or more of the propellers 215-i may be configured to rotate about axes that are neither horizontal nor vertical, and to provide forces of lift and/or thrust in directions corresponding to such axes accordingly.

The propulsion motors 213-i may further include one or more sensors 217-i thereon. The sensors 217-i may be onboard components that are configured to monitor one or more characteristics or attributes of the propulsion motors 213-i and/or the propellers 215-i during operation, and may include one or more tachometers (e.g., speed observers, acoustic speed sensors, optical speed sensors, Hall effect sensors, or any other sensors of rotating speed), temperature sensors, current sensors, voltage sensors, resistance sensors, vibration sensors, stress/strain sensors (e.g., load cells or sensors), or any other type or form of sensors in accordance with the present disclosure.

Although the block diagram of FIG. 2 includes a single box corresponding to one propulsion motor 213-i having one propeller 215-i and one sensor 217-i, those of ordinary skill in the pertinent arts will recognize that any number or type of motors, propellers or sensors may be provided aboard the aerial vehicle 210 in accordance with the present disclosure.

The environmental or operational sensors 220 may include any components or features for determining one or more attributes of an environment in which the aerial vehicle 210 is operating, or may be expected to operate, including extrinsic information or data or intrinsic information or data. As is shown in FIG. 2, the environmental or operational sensors 220 may include, but are not limited to, a Global Positioning System ("GPS") receiver or sensor 221, a compass 222, a speedometer 223, an altimeter 224, a thermometer 225, a barometer 226, an accelerometer 227, a gyroscope 228 or a magnetometer 229. The GPS sensor 221 may be any device, component, system or instrument adapted to receive signals (e.g., trilateration data or information) relating to a position of the aerial vehicle 210 from one or more GPS satellites of a GPS network (not shown). The compass 222 may be any device, component, system, or instrument adapted to determine one or more directions with respect to a frame of reference that is fixed with respect to the surface of the Earth (e.g., a pole thereof). The speedometer 223 may be any device, component, system, or instrument for determining a speed or velocity of the aerial vehicle 210, and may include related components (not shown) such as pitot tubes, accelerometers, or other features for determining speeds, velocities, or accelerations.

The altimeter 224 may be any device, component, system, or instrument for determining an altitude of the aerial vehicle 210, and may include any number of barometers, transmitters, receivers, range finders (e.g., laser or radar) or other features for determining heights. The thermometer 225 and the barometer 226 may be any devices, components, systems, or instruments for determining local air temperatures or atmospheric pressures, respectively, within a vicinity of the aerial vehicle 210. The accelerometer 227 may be any mechanical or electrical device, component, system, or instrument for sensing or measuring accelerations, including but not limited to devices having one or more potentiometers, linear variable differential transformers, variable reluctance devices or piezoelectric components.

The gyroscope 228 may be any mechanical or electrical device, component, system, or instrument for determining an orientation, e.g., the orientation of the aerial vehicle 210. For example, the gyroscope 228 may be a traditional mechanical gyroscope having at least a pair of gimbals and a flywheel or rotor. Alternatively, the gyroscope 228 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 210. The magnetometer 229 may be any electrical component for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall effect magnetometer, or the like).

Those of ordinary skill in the pertinent arts will recognize that the environmental or operational sensors 220 may include any type or form of device or component for determining an environmental condition within a vicinity of the aerial vehicle 210 in accordance with the present disclosure. For example, the environmental or operational sensors 220 may include one or more air monitoring sensors (e.g., oxygen, ozone, hydrogen, carbon monoxide or carbon dioxide sensors or hygrometers), infrared sensors, ozone monitors, pH sensors, magnetic anomaly detectors, metal detectors, radiation sensors (e.g., Geiger counters, neutron detectors, alpha detectors), attitude indicators, depth gauges or the like, as well as one or more imaging devices (e.g., digital cameras), and are not limited to the sensors 221, 222, 223, 224, 225, 226, 227, 228, 229 shown in FIG. 2.

The test sensors 230 may include other components or features for detecting and capturing sound energy in a vicinity of an environment in which the aerial vehicle 210 is operating, or may be expected to operate. As is shown in FIG. 2, the test sensors 230 may include a microphone 231, a piezoelectric sensor 232, a vibration sensor 233, a contact sensor 234, a current sensor 235, a voltage sensor 236, a stress/strain sensor 237 or a tachometer 238. The microphone 231 may be any type or form of transducer (e.g., a dynamic microphone, a condenser microphone, a ribbon microphone, a crystal microphone) configured to convert acoustic energy of any sound pressure level or intensity and across any or all frequencies into one or more electrical signals, and may include any number of diaphragms, magnets, coils, plates, or other like features for detecting and recording such energy. The microphone 231 may also be provided as a discrete component, or in combination with one or more other components, e.g., an imaging device such as a digital camera. Furthermore, the microphone 231 may be configured to detect and record acoustic energy from any and all directions.

The piezoelectric sensor 232 may be configured to convert changes in pressure to electrical signals, including but not limited to such pressure changes that are initiated by the presence of acoustic energy across various bands of frequencies, and may include one or more crystals, electrodes or other features. The vibration sensor 233 may be any device configured to detect vibrations of one or more components of the aerial vehicle 210, and may also be a piezoelectric device. For example, the vibration sensor 233 may include one or more accelerometers, e.g., an application-specific integrated circuit and one or more microelectromechanical sensors in a land grid array package, that are configured to sense differential accelerations along one or more axes over predetermined periods of time and to associate such accelerations with levels of vibration and, therefore, sound.

The contact sensor 234 may be any type or form of sensing component for determining whether one or more aspects of the aerial vehicle 210 is proximate to or in contact with one or more other objects. For example, the contact sensor 234 may be provided beneath one or more landing gear components to determine whether such components are in contact with ground or other surfaces, or proximate to ground or other surfaces. The contact sensor 234 may also be provided in association with one or more payload engagement systems or any other aspects of the aerial vehicle 210, to determine whether such systems or aspects are in contact with or proximate to one or more other objects (e.g., payloads or other objects within a vicinity of a location where a payload is to be deposited or from which the payload is to be retrieved). In some embodiments, the contact sensor 234 may have any number of switches, probes or circuits that may enable current flow when the aerial vehicle 210 is in contact with or proximate to one or more other objects. In some other embodiments, the contact sensor 234 may have any number of capacitive or inductive elements for enabling a current flow when the aerial vehicle 210 is in contact with or proximate to one or more other objects. Any type or form of sensor that may determine (e.g., generate and/or provide one or more signals) when one or more aspects of the aerial vehicle 210 is in contact with or proximate to one or more other objects may be utilized in accordance with the present disclosure.

The current sensor 235 and the voltage sensor 236 may be any type or form of component for generating a signal proportional to an electric current (e.g., alternating current and/or direct current) or voltage associated with one or more aspects of the aerial vehicle 210. In some embodiments, the signal may be an analog voltage or current. In other embodiments, the signal may be a digital output. For example, the current sensor 235 may be any type of device or component for detecting or sensing current flow (e.g., Hall effect sensors, inductive sensors, magnetoresistive sensors, or others) to or from the processor 212, the memory 214, the transceiver 216, the one or more propulsion motors 213-i, or any of the environmental or operational sensors 220 or other test sensors 230, or any other aspect of the aerial vehicle 210. The voltage sensor 236 may be any type of device or component for detecting or sensing voltages across one or more of the processor 212, the memory 214, the transceiver 216, the one or more propulsion motors 213-i, or any of the environmental or operational sensors 220 or other test sensors 230, or any other aspect of the aerial vehicle 210.

The stress/strain sensor 237 may be any type or form of component for generating a signal proportionate to a stress or a strain on one or more aspects of the aerial vehicle 210. For example, the stress/strain sensor 237 may be a load cell, a capacitive gage or sensor, a resonant gage or sensor, a strain gage or sensor, or any other type of gage or sensor. The stress/strain sensor 237 may be formed from metals, semiconductors or any other suitable materials, and may include one or more circuits or other components for generating signals in response to stresses or strains. In some embodiments, the stress/strain sensor 237 may be a single, unitary component for sensing both stresses and strains. In other embodiments, the stress/strain sensors 237 may be two or more discrete components for sensing stresses or strains individually. Additionally, the stress/strain sensors 237 may further include one or more components for responding to or compensating for the effects of temperature or other environmental effects.

The tachometer 238 may be any type or form of component for generating a signal proportionate to a rotating speed of one or more aspects of the aerial vehicle 210, e.g., one or more of the propulsion motors 213-i and/or the propellers 215-i. For example, the tachometer 238 may be an analog tachometer, a digital tachometer, a contact tachometer, a non-contact tachometer, or any other type or form of component. In some embodiments, the tachometer may be a speed observer, e.g., an acoustic or optical speed observer. Additionally, the tachometer 238 may further include one or more components for responding to or compensating for the effects of temperature or other environmental effects.

Those of ordinary skill in the pertinent arts will recognize that the test sensors 230 may include any type or form of device or component for determining an environmental condition within a vicinity of the aerial vehicle 210 in accordance with the present disclosure. For example, the test sensors 230 may include one or more air monitoring sensors (e.g., oxygen, ozone, hydrogen, carbon monoxide or carbon dioxide sensors or hygrometers), infrared sensors, ozone monitors, pH sensors, magnetic anomaly detectors, metal detectors, radiation sensors (e.g., Geiger counters, neutron detectors, alpha detectors), attitude indicators, depth gauges or the like, as well as one or more imaging devices (e.g., digital cameras), and are not limited to the sensors 231, 232, 233, 234, 235, 236, 237, 238 shown in FIG. 2. Furthermore, although the test sensors 230 are labeled as "test" sensors, such sensors 230 may be utilized to capture information or data during any aspect of operation of the aerial vehicle 210, such as when the aerial vehicle 210 is conducting one or more in-flight evolutions, and need not be limited to use during one or more testing evolutions. Likewise, any of the environmental or operational sensors 220 may be utilized in conjunction with any of the test sensors 230, and vice versa, or with any number of other components of the aerial vehicle 210, including but not limited to one or more of the processor 212, the memory 214, the transceiver 216, or any of the propulsion motors 213-i, as well as the testing facility 240 or the data processing system 270.

The testing facility 240 may be any facility, structure, station or other location where one or more automated inspections may be performed on one or more aerial vehicles, such as the aerial vehicle 210. The testing facility 240 may include one or more features or components for enabling arrivals or departures of aerial vehicles therefrom, such as the landing pad 145 shown in FIGS. 1A through 1L. In some embodiments, the testing facility 240 may be provided in association with one or more facilities, structures, stations or locations associated with one or more missions to be performed by the aerial vehicle 210, e.g., delivery or surveillance operations. In some other embodiments, the testing facility 240 may be an independent or freestanding facility, structure, station or location not associated with any one specific mission. For example, in some embodiments, one or more aspects of the testing facility 240 may be ground-based, e.g., provided about a landing pad or other area, or provided in a range or other testing facility configured to accommodate one or more aerial vehicles passing over or therethrough. In some embodiments, one or more aspects of the testing facility 240 may be airborne, e.g., provided aloft aboard one or more aerial vehicles.

As is shown in FIG. 2, the testing facility 240 includes a number of computer components, including one or more physical computer servers 242 having a plurality of computer processors 244 associated therewith, as well as one or more data stores (e.g., databases) 246. The testing facility 240 further includes a plurality of sensors 250, including but not limited to one or more microphones 251 (or other acoustic sensors), one or more current sensors 252, one or more voltage sensors 253, one or more imaging devices 254, one or more vibration sensors 255, and one or more thermometers 256.

The servers 242, the processors 244 and the data stores 246 may be provided for controlling any aspect of the operations of the testing facility 240, including but not limited to receiving, analyzing and/or storing information or data captured by the environmental or operational sensors 220, the test sensors 230 and/or the facility sensors 250. For example, in accordance with some embodiments of the present disclosure, the servers 242 and/or the processors 244 may transmit instructions or commands to one or more aerial vehicles, e.g., the aerial vehicle 210, regarding a testing sequence to be performed thereby at the testing facility 240. The servers 242 and/or the processors 244 may also receive information or data from the one or more aerial vehicles regarding operational data captured during the performance of one or more missions, e.g., by the environmental or operational sensors 220 or the test sensors 230, and/or testing data captured during the execution of a testing sequence, e.g., by either the environmental or operational sensors 220, the test sensors 230 or the facility sensors 250, and store such information or data in the one or more data stores 246. Additionally, the servers 242 and/or the processors 244 may also communicate with one or more other computer devices (not shown) over the network 280, as indicated by line 248, through the sending and receiving of digital data.

Like the microphone 231, the microphone 251 may be any type or form of transducer (e.g., a dynamic microphone, a condenser microphone, a ribbon microphone, a crystal microphone) configured to convert acoustic energy of any sound pressure level or intensity and across any or all frequencies into one or more electrical signals, and may include any number of diaphragms, magnets, coils, plates, or other like features for detecting and recording such energy. The microphone 251 may also be provided as a discrete component, or in combination with one or more other components, e.g., an imaging device such as a digital camera, a depth camera, an infrared camera, or the like. Furthermore, the microphone 251 may be configured to detect and record acoustic energy from any and all directions. In addition to microphones, the testing facility 240 may utilize or operate any number of other acoustic sensors, e.g., piezoelectric sensors and/or vibration sensors that may be similar to the piezoelectric sensors 232 and/or vibration sensors 233.

Like the current sensors 235 and the voltage sensors 236, the current sensors 252 and the voltage sensors 253 may be any type or form of component for generating a signal proportional to an electric current (e.g., alternating current and/or direct current) or voltage associated with one or more aspects of the aerial vehicle 210. In some embodiments, the signal may be an analog voltage or current. In other embodiments, the signal may be a digital output. For example, the current sensor 252 may be any type of device or component for detecting or sensing current flow (e.g., Hall effect sensors, inductive sensors, magnetoresistive sensors, or others) to or from any aspect of the aerial vehicle 210. The voltage sensor 253 may be any type of device or component for detecting or sensing voltages across any other aspect of the aerial vehicle 210.

The imaging device 254 may be any form of optical recording device that may be used to photograph or otherwise record imaging data of aerial vehicles within the testing facility 240, or for any other purpose, such as a digital camera, a range camera, a depth camera, an infrared camera, a radiographic camera, or the like. The imaging device 254 may include one or more sensors, memory or storage components and processors, and such sensors, memory components or processors may further include one or more photosensitive surfaces, filters, chips, electrodes, clocks, boards, timers or any other relevant features (not shown). Such imaging devices 254 may capture imaging data in the form of one or more still or moving images of any kind or form, as well as any relevant audio signals or other information, within one or more designated locations within the testing facility 240, and may be connected to the server 242 and/or the processors 244 or with one another by way of a wired or wireless connection that may be dedicated or comprise all or part of an internal network (not shown). Additionally, the imaging device 254 may be adapted or otherwise configured to communicate with the aerial vehicle 210 or the data processing system 270, or to access one or more other computer devices by way of the network 280.

Moreover, the imaging device 254 may also include manual or automatic features for modifying a respective position, field of view or orientation. For example, a digital camera may be configured in a fixed position, or with a fixed focal length (e.g., fixed-focus lenses) or angular orientation. Alternatively, the imaging device 254 may include one or more actuated or motorized features for adjusting a position of the imaging device 254, or for adjusting either the focal length (e.g., zooming the imaging device 254) or the angular orientation (e.g., the roll angle, the pitch angle or the yaw angle), by causing a change in the distance between the sensor and the lens (e.g., optical zoom lenses or digital zoom lenses), a change in the location of the imaging device 254, or a change in one or more of the angles defining the angular orientation.

For example, the imaging device 254 may be hard-mounted to a support or mounting that maintains the device in a fixed configuration or angle with respect to one, two or three axes. Alternatively, however, the imaging device 254 may be provided with one or more motors and/or controllers for manually or automatically operating one or more of the components, or for reorienting a position, axis or direction of the imaging device 254, i.e., by moving, panning or tilting the imaging device 254. Panning the imaging device 254 may cause a rotation within a horizontal plane or about a vertical axis (e.g., a yaw), while tilting the imaging device 254 may cause a rotation within a vertical plane or about a horizontal axis (e.g., a pitch). Additionally, the imaging device 254 may be rolled, or rotated about its axis of rotation, and within a plane that is perpendicular to the axis of rotation and substantially parallel to a field of view of the imaging device 254. The imaging device 254 may also be provided on a vehicle enabled to pass within an operating range of the aerial vehicle 210.

The imaging device 254 may also digitally or electronically adjust an image identified in a field of view, subject to one or more physical and operational constraints. For example, the imaging device 254 may virtually stretch or condense the pixels of an image in order to focus or broaden the field of view of the imaging device 254, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Like the vibration sensors 233, the vibration sensors 255 may be any device configured to detect vibrations of one or more components of the aerial vehicle 210, and may also be a piezoelectric device. In some embodiments, the vibration sensor 255 may include one or more accelerometers, e.g., an application-specific integrated circuit and one or more microelectromechanical sensors in a land grid array package, that are configured to sense differential accelerations along one or more axes over predetermined periods of time and to associate such accelerations with levels of vibration and, therefore, sound.

Like the thermometer 225, the thermometer 256 may be any device, component, system, or instrument for determining local temperatures of one or more aspects of the aerial vehicle 210. For example, the thermometer 256 may be configured to determine one or more operating temperatures, bearing temperatures, oil temperatures, battery temperatures, coil temperatures, chip and/or processor temperatures, or any other temperatures of any component of the aerial vehicle 210.

Although the testing facility 240 of FIG. 2 includes single boxes corresponding to one microphone 251, one current sensor 252, one voltage sensor 253, one imaging device 254, one vibration sensor 255 and one thermometer 256, those of ordinary skill in the pertinent arts will recognize that any number or type of microphones, imaging devices, vibration sensors, current sensors, voltage sensors, thermometers or any other sensors may be provided at the testing facility 240 in accordance with the present disclosure. Moreover, in addition to the microphone 251, the current sensor 252, the voltage sensor 253, the imaging device 254, the vibration sensor 255, and the thermometer 256, the testing facility 240 may be configured or equipped with one or more other ground-based or airborne sensors, including but not limited to accelerometers, gyroscopes and/or magnetometers, or other sensors or devices.

The data processing system 270 includes one or more physical computer servers 272 having a plurality of computer processors 274 associated therewith, as well as one or more data stores (e.g., databases) 276 provided for any specific or general purpose. For example, the data processing system 270 of FIG. 2 may be independently provided for the exclusive purpose of receiving, analyzing or storing acoustic signals or other information or data received from the aerial vehicle 210 or, alternatively, provided in connection with one or more physical or virtual services configured to receive, analyze or store such acoustic signals, information or data, as well as one or more other functions. The servers 272 may be connected to or otherwise communicate with the processors 274 and the data stores 276. The data stores 276 may store any type of information or data, including but not limited to acoustic signals, information or data relating to acoustic signals, or information or data regarding environmental conditions, operational characteristics, or positions, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., media files received from the aerial vehicle 210, or from one another, or from one or more other external computer systems (not shown) via the network 280. In some embodiments, the data processing system 270 may be provided in a physical location. In other such embodiments, the data processing system 270 may be provided in one or more alternate or virtual locations, e.g., in a "cloud"-based environment. In still other embodiments, the data processing system 270 may be provided onboard one or more aerial vehicles, including but not limited to the aerial vehicle 210.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210, the testing facility 240 or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 210 may be adapted to transmit information or data in the form of synchronous or asynchronous messages to the testing facility 240 or the data processing system 270 or to any other computer device in real time or in near-real time, or in one or more offline processes, via the network 280. Those of ordinary skill in the pertinent art would recognize that the aerial vehicle 210, the testing facility 240 or the data processing system 270 may operate, include or be associated with any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 212, the processor 244 or the processor 274, or any other computers or control systems utilized by the aerial vehicle 210, the testing facility 240 or the data processing system 270, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
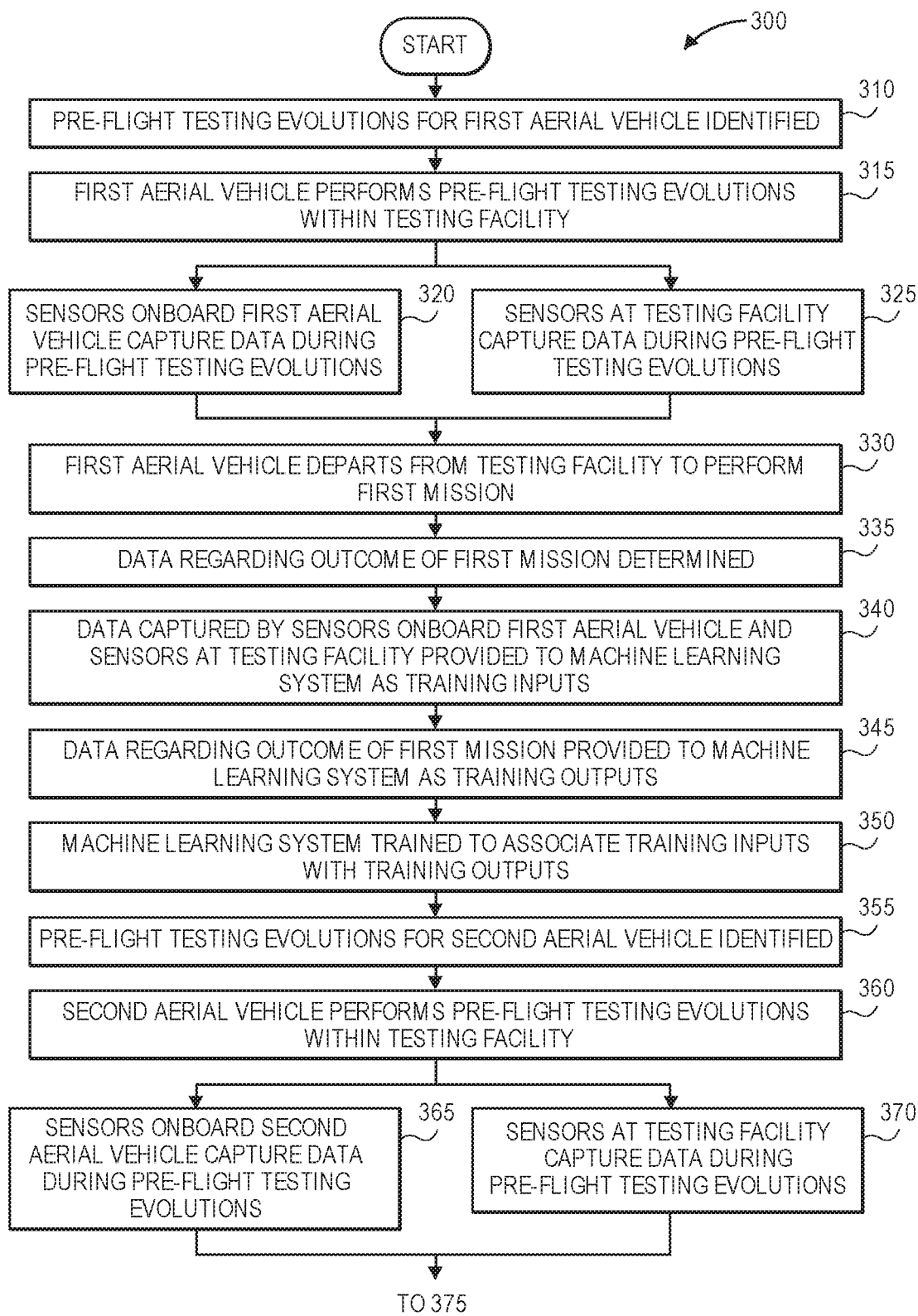
FIGS. 3A and 3B are a flow chart of one process for automated pre-flight or in-flight testing of aerial vehicles in accordance with embodiments of the present disclosure.
Figure 3B:
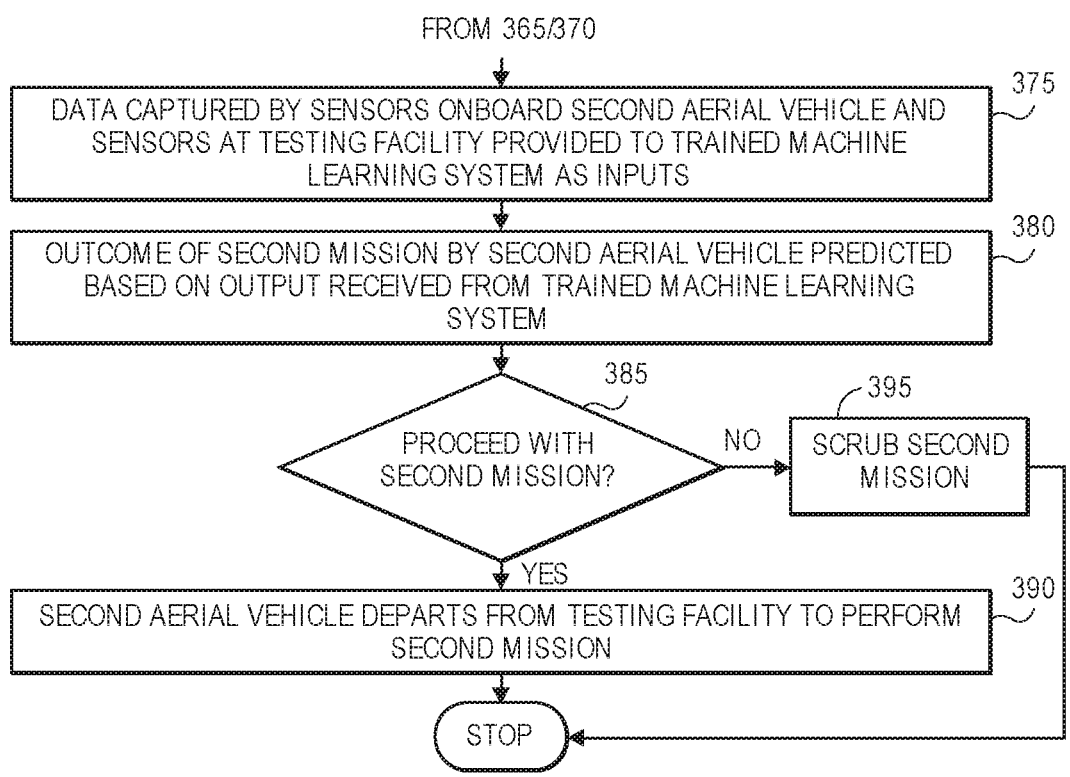

As is discussed above, an aerial vehicle may be evaluated based on information or data captured both by one or more onboard sensors during training evolutions or during a mission and also by the onboard sensors and one or more ground-based or airborne sensors. The information or data may be provided to a machine learning system that is configured to operate in two distinct phases, e.g., a training phase, in which the machine learning system is programmed to associate such data with data regarding outcomes of missions performed by aerial vehicles, e.g., in one or more labeled sequences, as well as an operational phase, in which the trained machine learning system is used to predict data regarding outcomes of missions based on data captured by an aerial vehicle or one or more ground-based or airborne sensors. Referring to FIGS. 3A and 3B, a flow chart 300 of one process for automated pre-flight or in-flight testing of aerial vehicles in accordance with embodiments of the present disclosure is shown.

At box 310, one or more pre-flight testing evolutions are identified for a first aerial vehicle. For example, the testing evolutions may call for operating each of the propulsion motors and/or propellers provided thereon independently or in tandem, at any range of operating speeds, or causing control surfaces such as rudders, elevators, stabilizers, spoilers, ailerons, flaps or slats to move within any range of operation (e.g., linear or angular displacement). The testing evolutions may further call for determining versions of software applications or firmware operating on the aerial vehicle or in association with one or more components. The testing evolutions may also call for starting up (e.g., powering up and/or booting up) one or more of the components, verifying the integrity of the one or more avionics systems, servo systems, communications systems, sensors, payload engagement systems, safety systems, power systems or other systems operating on the aerial vehicle. The testing evolutions may further call for determining levels of noise emitted by the aerial vehicle during ranges of operations of the propulsion motors, propellers, control surfaces or other systems. At box 315, the first aerial vehicle performs the one or more pre-flight testing evolutions within a testing facility. The testing facility may be located at an origin of a mission for the first aerial vehicle, at a destination for the mission, or at an intermediate or other point that is neither the origin nor the destination.

At box 320, one or more sensors onboard the first aerial vehicle capture data during the performance of the pre-flight testing evolutions by the first aerial vehicle. Simultaneously, or in parallel, at box 325, one or more sensors at the testing facility capture data during the performance of the pre-flight testing evolutions by the first aerial vehicle. For example, the aerial vehicle and/or the testing facility may be outfitted with one or more sensors such as imaging devices, acoustic sensors, or other sensors for capturing any type or form of data from the aerial vehicle during the pre-flight testing evolutions.

At box 330, the first aerial vehicle departs from the testing facility to perform a first mission. For example, the first aerial vehicle may have been tasked with delivering a payload from one location to another location, performing one or more law enforcement or surveillance operations, transiting from one location to another location, or undertaking any other mission.

At box 335, data regarding an outcome of the first mission is determined. For example, the data may be of a binary nature, viz., that the first mission was completed or was not completed, or that the first mission succeeded or failed. Alternatively, the data may provide one or more additional indications as to the extent that the first mission was performed. For example, the data may indicate that the first mission was successfully performed without restrictions. The data may also indicate that the first mission was successfully performed with one or more restrictions, e.g., at a reduced speed or altitude, or subject to one or more other limitations. The data may further indicate that the first mission was aborted in flight, e.g., that the first aerial vehicle was required to return to an origin, or to land at an alternate location other than an intended destination, or that the aerial vehicle failed to complete the obligations of the first mission in one or more respects. Alternatively, the data may indicate that the first mission was scrubbed, i.e., canceled, or was assigned to another aerial vehicle. In some embodiments, the one or more sensors aboard the aerial vehicle may further capture additional information or data during the performance of the mission. For example, such information or data may include extrinsic information or data, e.g., environmental conditions encountered during the mission, as well as intrinsic information or data, e.g., dynamic attributes such as altitudes, courses, speeds, rates of climb or descent, turn rates, or accelerations of the aerial vehicle during the mission, or noise or vibrations radiated thereby, and may be transferred to one or more servers via wired or wireless means.

At box 340, the data captured by the sensors provided aboard the first aerial vehicle, and the data captured by the sensors at the testing facility, are provided to a machine learning system as training inputs. The data captured by such sensors may be provided to one or more servers or other computer devices on which the machine learning system is operated in any manner, e.g., synchronously or asynchronously, and via one or more wired or wireless means, such as in one or more batch processes. At box 345, data regarding the outcome of the first mission is provided to the machine learning system as training outputs. The data regarding the outcome may be qualitative or quantitative in nature. For example, the data may include a binary indication that the first mission was a success or a failure. Alternatively, the data may include one or more metrics, values or other information regarding the first mission, or any rates of change and/or acceleration associated with such metrics, values or other information. For example, the data may indicate an elapsed time required to complete a mission, or times at which the first aerial vehicle departed from an origin or arrived at a destination or one or more intervening waypoints, or times at which the first aerial vehicle engaged in one transit mode (e.g., hovering or forward flight), or transitioned to another transit mode. The data may further include information regarding courses, speeds and/or altitudes at which the first aerial vehicle traveled during various stages of the first mission, or any other data regarding the first mission. The data may also include any aspects of power outputted by one or more propulsion motors aboard the aerial vehicle, currents drawn or voltages across such propulsion motors, torques supplied to drive shafts by such propulsion motors, forces of lift and/or thrust generated by such propulsion motors, operating temperatures of any aspect of the aerial vehicle, or the like. The data may further include rates of change of such metrics, values or other information.

Although the process shown in the flow chart 300 of FIGS. 3A and 3B describes actions undertaken by a first aerial vehicle, any number of aerial vehicles may perform pre-flight testing evolutions, capture data and perform missions, and any number of testing facilities may capture data regarding such missions, in accordance with the present disclosure.

At box 350, the machine learning system is trained to associate the training inputs with the training outputs, e.g., based on the data captured by the sensors aboard the aerial vehicle and/or the data captured at the testing facility, and based on the data regarding the outcomes. The machine learning system may be trained according to any techniques. In some embodiments, some of the data captured by the sensors aboard the aerial vehicle and/or at the testing facility may be withheld as a set of test inputs (or validation inputs), and some of the data regarding the outcomes may be withheld as a set of test outputs (or validation outputs). The test inputs and test outputs may be subsequently provided to the machine learning system in order to determine whether or an extent to which the machine learning system has been properly trained to associate data regarding an aerial vehicle with data regarding an outcome of a mission to be performed by the aerial vehicle. Alternatively, the training inputs and/or test inputs may include one or more attributes of missions that were performed.

At box 355, after the machine learning system has been trained, pre-flight testing evolutions for a second aerial vehicle are identified. The second aerial vehicle may have one or more attributes in common with the first aerial vehicle, e.g., may be members of a common class or fleet, or may be an entirely different aerial vehicle. The pre-flight testing evolutions may be the same pre-flight testing evolutions that were performed by the first aerial vehicle at box 315, or more, fewer or different testing evolutions. At box 360, the second aerial vehicle performs the pre-flight testing evolutions within the testing facility.

At box 365, one or more sensors aboard the second aerial vehicle capture data during the performance of the pre-flight testing evolutions by the second aerial vehicle. Simultaneously, or in parallel, at box 370, one or more sensors at the testing facility capture data during the performance of the pre-flight testing evolutions by the second aerial vehicle. The data may be of the same type or category as the data captured by the one or more sensors of the first aerial vehicle at box 320 or the sensors of the testing facility at box 325, or of different types or categories.

At box 375, data captured by the sensors aboard the second aerial vehicle and the sensors at the testing facility is provided to the trained machine learning system as inputs. Alternatively, the inputs may include one or more attributes of the second mission, e.g., locations of origins, destinations and/or intervening waypoints, as well as masses of one or more payloads or other aspects or characteristics of the second mission. At box 380, an outcome of the second mission by the second aerial vehicle is predicted based on an output received from the trained machine learning system. For example, the outcome may be predicted based on a binary indicator, e.g., of success or of failure, as well as a probability of a predicted outcome (e.g., a probability that the second mission will be a success or a failure), or one or more qualitative or quantitative metrics associated with a predicted outcome.

At box 385, whether to proceed with the second mission is determined based at least in part on the predicted outcome of the second mission. If the predicted outcome indicates that the second mission is not likely to succeed, or is likely to fail, the process may advance to box 395, where the second mission is scrubbed, i.e., canceled or postponed, or assigned to another aerial vehicle, and the process ends. Alternatively, a determination as to whether to proceed may be based on a value of a predicted qualitative or quantitative metric associated with the predicted outcome, e.g., a power level, a torque, a load generated, a temperature, or the like. If the predicted outcome indicates that the second mission is likely to succeed, or is unlikely to fail, then the process advances to box 390, where the second aerial vehicle departs from the testing facility to perform the second mission.

Figure 4B:
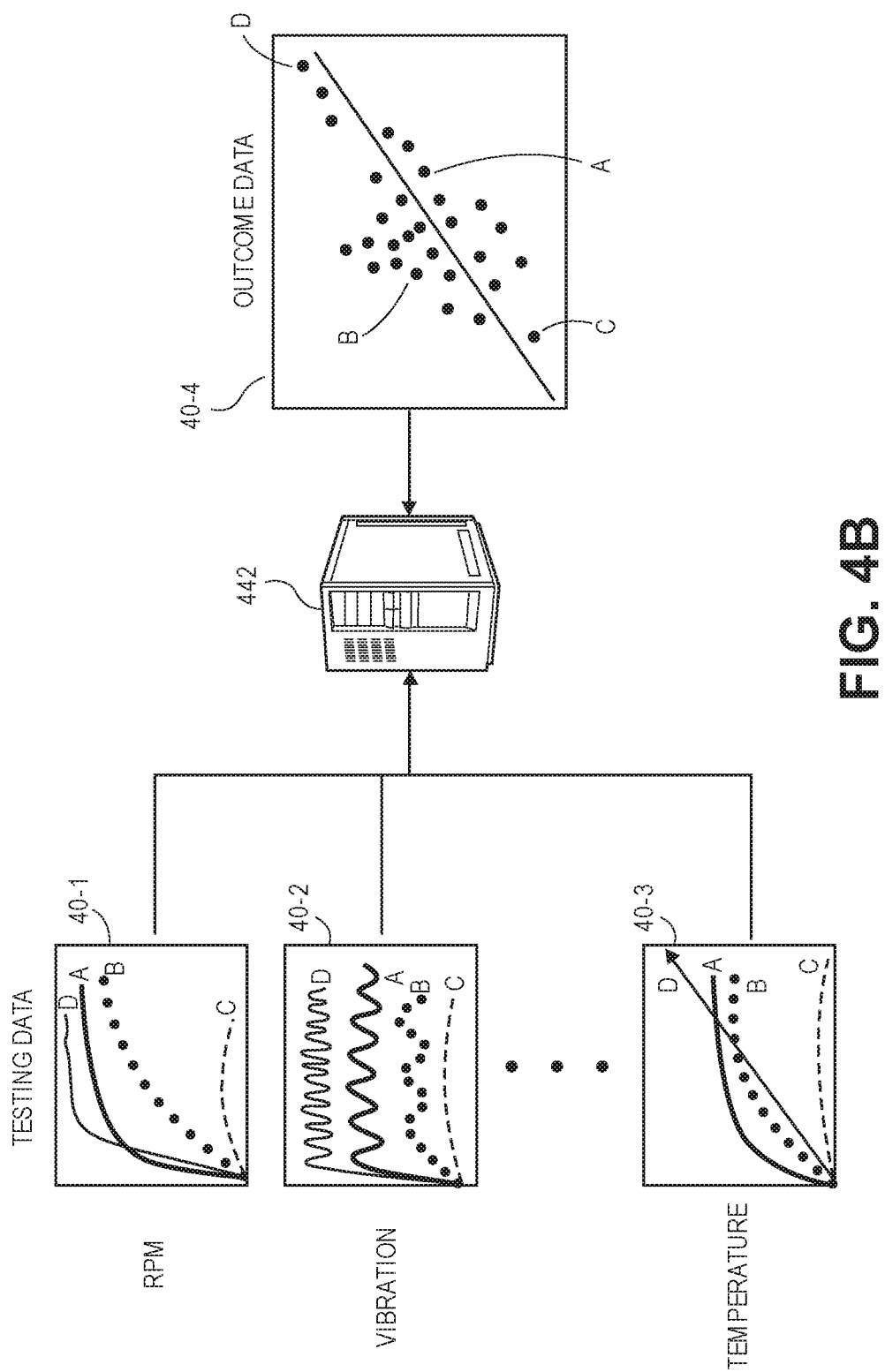

In accordance with embodiments of the present disclosure, any type or form of data regarding one or more evolutions involving one or more aspects of an aerial vehicle may be captured or otherwise determined and used to train a machine learning system to predict an outcome of a mission to be performed by the aerial vehicle, or by one or more other aerial vehicles. The evolutions may be performed while the aerial vehicle is grounded (e.g., pre-flight testing evolutions) or while the aerial vehicle is airborne (e.g., in-flight evolutions). The data may include seemingly unrelated variables, and yet may be provided to the machine learning system, along with data regarding an outcome of a mission completed by the aerial vehicle, to train the machine learning system. Referring to FIGS. 4A and 4B, views of aspects of one system for automated pre-flight or in-flight testing of aerial vehicles in accordance with embodiments of the present disclosure are shown. Except where otherwise noted, reference numerals preceded by the number "4" shown in FIGS. 4A and 4B indicate components or features that are similar to components or features having reference numerals preceded by the number "2" shown in the block diagram of FIG. 2, or by the number "1" shown in FIGS. 1A through 1L.

As is shown in FIG. 4A, an aerial vehicle may be subjected to a variety of evolutions. For example, one or more propulsion motors of the aerial vehicle may be operated with the aerial vehicle on the ground (e.g., when the aerial vehicle is tethered at a facility) or while the aerial vehicle is in-flight, and testing data regarding the operation of the propulsion motor may be captured or otherwise determined. Additionally, one or more control surfaces may be operated within full or partial ranges of operation, e.g., from a first position to a second position, and testing data regarding the operation of the control surfaces may be captured or otherwise determined. Likewise, one or more aspects of a payload engagement system (e.g., doors, arms, pulleys, grips, effectors or the like) may also be operated within full or partial ranges of deflection, and testing data regarding the operation of the payload engagement system may be captured or otherwise determined. Any other aspect of the aerial vehicle may also be operated, and testing data regarding the operation of such aspects may be captured or otherwise determined.

In some embodiments, the testing data captured or determined during the evolutions may include, but is not limited to, an operating speed of a propulsion motor and/or propeller (e.g., revolutions per minute, or rpm); any frequency or spectral data regarding vibrations of the propulsion motor or the propeller; power consumed by the propulsion motor (e.g., watts or kilowatts); currents and/or voltages supplied to the propulsion motor; measured stresses and/or strains on one or more components of the propulsion motor or the propeller; images captured of the propulsion motor and/or the propeller; torques acting on the propulsion motor and/or the propeller (e.g., on a drive shaft); temperatures sensed in association with the propulsion motor and/or the propeller (e.g., operating temperatures of the propulsion motor, such as temperatures of one or more coils, bearings or other components); ranges of deflection of control surfaces; ranges of deflection of payload engagement components such as doors, arms or effectors; hydraulic pressures; response times between instructions or commands to operate one or more of such components and actual operations; or any other data.

As is also shown in FIG. 4A, following the completion of a mission by the aerial vehicle 410, any type or form of data regarding an outcome of the mission may also be captured or otherwise determined. For example, the data may indicate whether a mission was completed without restrictions, or subject to one or more restrictions, may be determined. Alternatively, whether the mission was aborted, e.g., whether the aerial vehicle was instructed to return to its origin, or to land at an alternate site or location, or whether the mission was otherwise declared a failure, may also be determined. For example, in some embodiments, data regarding the outcome of the mission may include, but is not limited to, an elapsed time between a departure at the origin and an arrival at the destination for completed missions, as well as a status of one or more payloads or other components aboard the aerial vehicle prior to, during or after the missions. The data regarding the outcome may include one or more predicted metrics, values or other information regarding the mission (or one or more rates of change and/or acceleration associated with such metrics, values or other information). Additionally, where a mission has been aborted or otherwise declared to be a failure, data regarding the outcome of the mission may further include an elapsed time between a departure from an origin and a determination that the mission was to be aborted or had failed. Whether the mission was a success or a failure, the data regarding the outcome of the mission may further any other extrinsic or intrinsic data regarding the aerial vehicle or its payloads or components, as well as data regarding an environment in which the mission was performed.

As is shown in FIG. 4B, some of the testing data captured during the performance of the evolution, or any other evolutions, e.g., data 40-1 regarding operating speeds of the propulsion motor and/or the propeller, data 40-2 regarding observed vibrations of the aerial vehicle, data 40-3 regarding one or more observed temperatures of the aerial vehicle, or any other data, may be provided to a server 442 as training inputs. Likewise, data 40-4 regarding the outcome of the mission may be provided to the server 442 as training outputs. The server 442 may operate one or more machine learning systems (e.g., classifiers, algorithms and/or techniques) that may be trained to associate the data 40-1, 40-2, 40-3 with the data 40-4, e.g., to determine or predict one or more outcomes based at least in part on the operating speeds, the vibrations, the temperatures, or any other data captured or otherwise determined during the evolutions.

Figure 5:
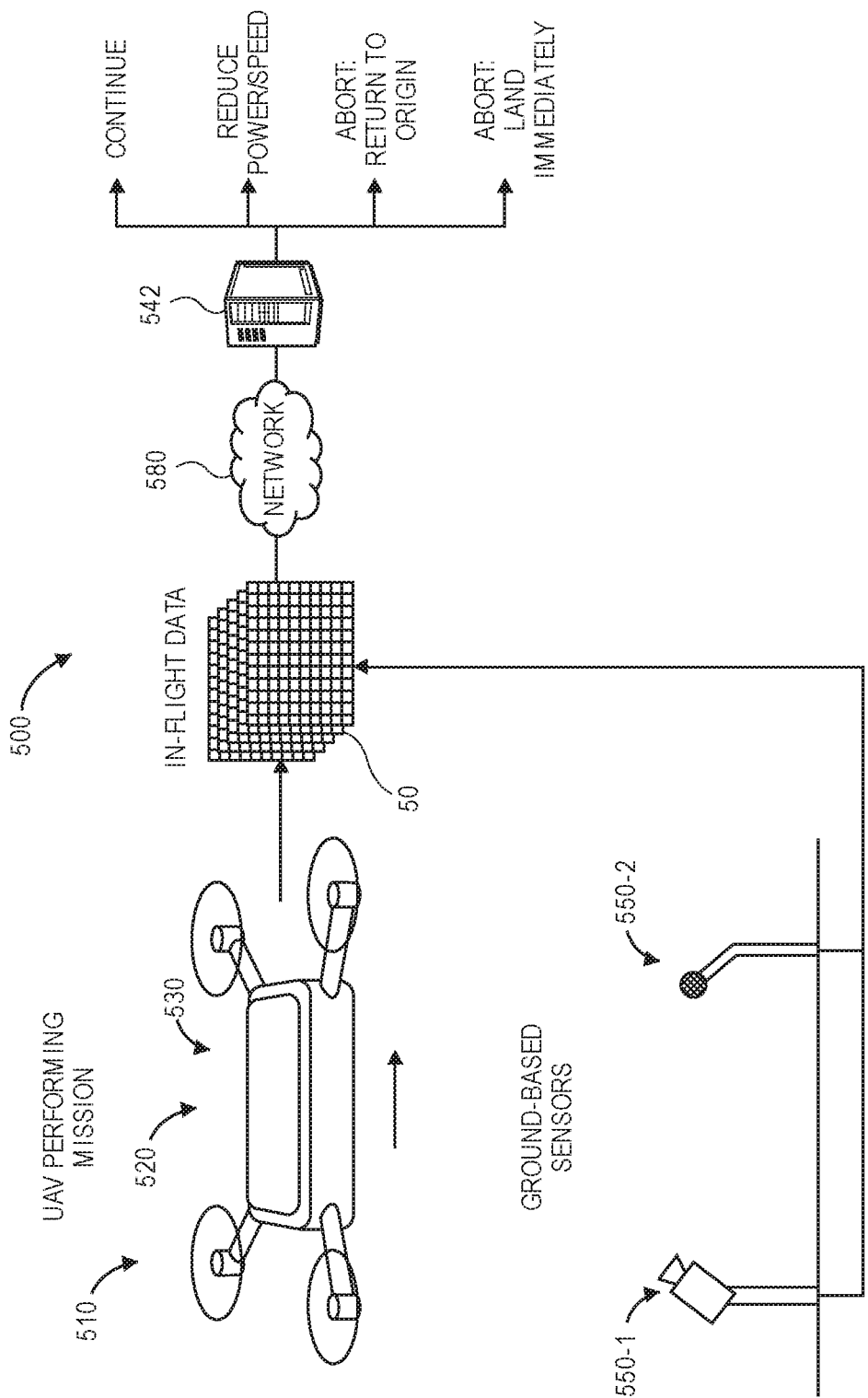
FIG. 5 is a view of aspects of one system for automated pre-flight or in-flight testing of aerial vehicles in accordance with embodiments of the present disclosure.

Once a machine learning system has been trained to associate testing or operational data captured from aerial vehicles with outcomes of missions performed by such aerial vehicles, the machine learning system may be used to predict an outcome of a mission to be performed by an aerial vehicle based on data captured during one or more pre-flight evolutions prior to the mission, or during the mission itself. Referring to FIG. 5, views of aspects of one system for automated pre-flight or in-flight testing of aerial vehicles in accordance with embodiments of the present disclosure are shown. Except where otherwise noted, reference numerals preceded by the number "5" shown in FIG. 5 indicate components or features that are similar to components or features having reference numerals preceded by the number "4" shown in FIGS. 4A and 4B, by the number "2" shown in the block diagram of FIG. 2, or by the number "1" shown in FIGS. 1A through 1L.

As is shown in FIG. 5, an aerial vehicle 510 is traveling during the performance of a mission. The aerial vehicle 510 includes a plurality of environmental or operational sensors 520 and a plurality of test sensors 530, and is traveling within a vicinity of a plurality of ground-based sensors 550-1, 550-2. The sensors 520, 530 aboard the aerial vehicle 510 may be configured to capture any type or form of information or data, including but not limited to extrinsic information or data, e.g., environmental conditions encountered during the mission, as well as intrinsic information or data, e.g., dynamic attributes such as altitudes, courses, speeds, rates of climb or descent, turn rates, or accelerations of the aerial vehicle during the mission, or noise or vibrations radiated thereby. Likewise, the ground-based sensors 550-1, 550-2 may also be configured to capture any type or form of data, e.g., extrinsic or intrinsic information or data. Alternatively, one of the sensors 550-1, 550-2, or other sensors, may be provided aboard one or more other aerial vehicles (not shown) or in any other locations.

Data 50 captured by one or more of the sensors 520, 530, 550-1, 550-2 may be provided to a server 542 over a network 580, e.g., by one or more wired or wireless protocols, e.g., Bluetooth® or any Wireless Fidelity (or "Wi-Fi") protocol. The server 542 may be a physical or "cloud"-based server configured to operate a machine learning system that is trained to predict an outcome of the mission based on the data 50. For example, upon receiving the data 50 as inputs, the server 542 may determine that the aerial vehicle 510 is able to continue with the mission based on an output of the machine learning system. The server 542 may also determine that the aerial vehicle 510 should reduce its power or airspeed, switch to one or more auxiliary power sources, shut down one motor and start up another motor, operate different combinations of control surfaces (e.g., in response to a failure of one or more of the control surfaces), based on the data 50, or take any other precautions or operate subject to any other restrictions. Alternatively, the server 542 may determine that the aerial vehicle 510 should abort its current mission and either return to an origin from which it departed or land immediately, e.g., at a most convenient or appropriate location. Any instructions or commands associated with the operation of the aerial vehicle 510 may be determined based on outputs from the machine learning system and provided to the aerial vehicle 510 accordingly.

The server 542 may be configured to receive the data 50 at regular times or intervals, and to provide such data to the trained machine learning system as inputs in order to predict or otherwise determine an outcome for the mission based on such data, as updated over time. Moreover, in some embodiments, the machine learning system may be operated by the server 542 or, alternatively, by one or more computer processors or systems operating aboard the aerial vehicle 510.

Figure 6A:
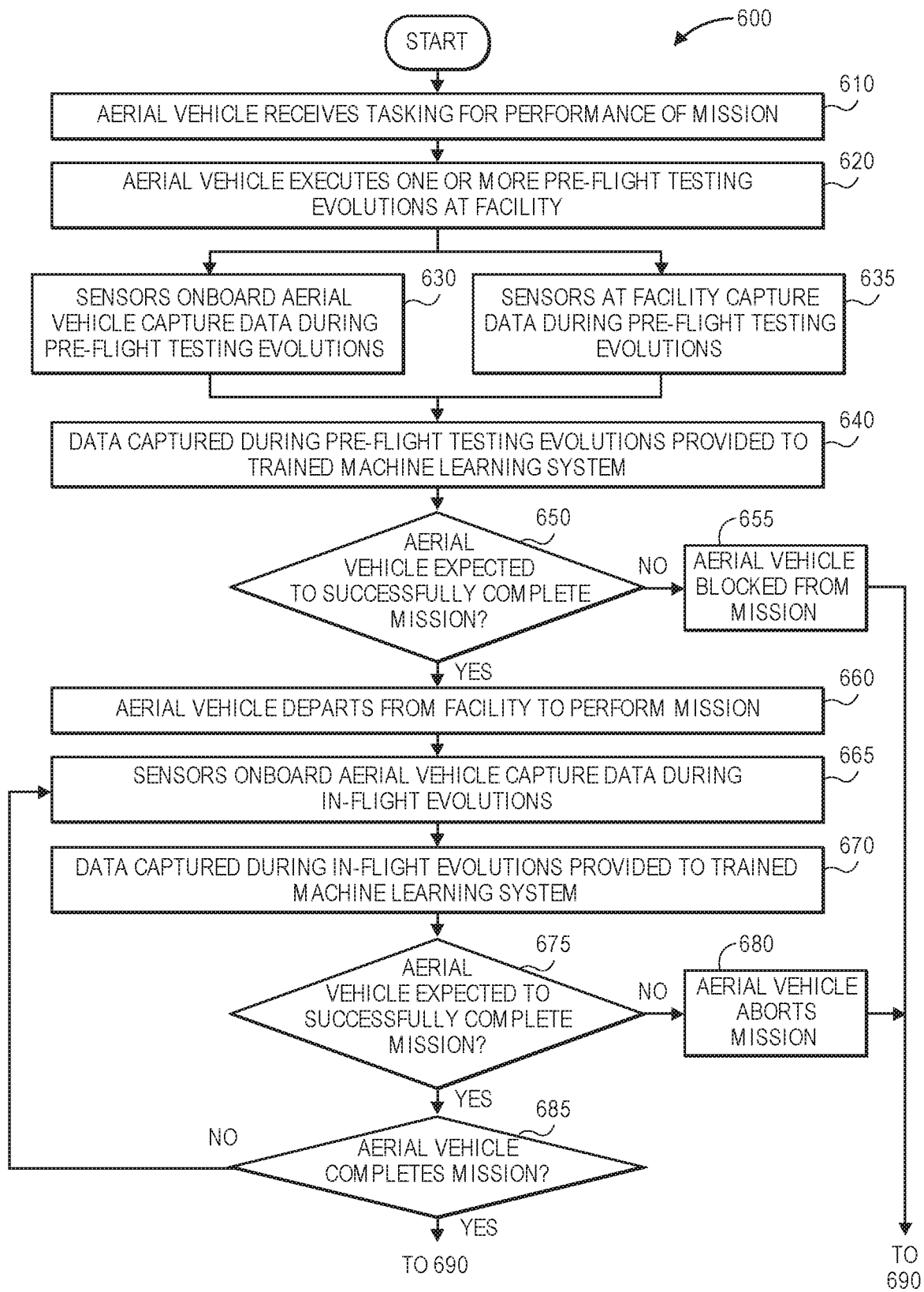
FIGS. 6A and 6B are a flow chart of one process for automated pre-flight or in-flight testing of aerial vehicles in accordance with embodiments of the present disclosure.
Figure 6B:
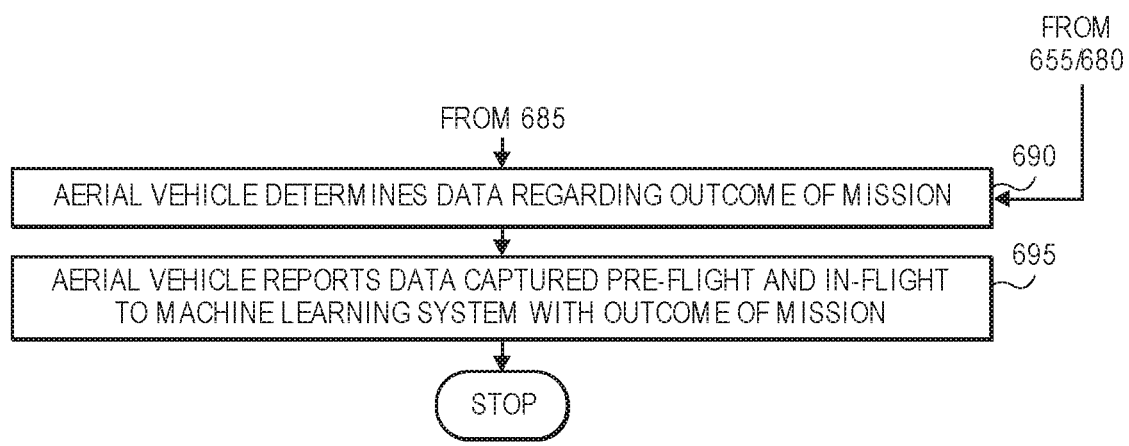

Referring to FIGS. 6A and 6B, a flow chart 600 of one process for automated pre-flight or in-flight testing of aerial vehicles in accordance with embodiments of the present disclosure is shown. At box 610, an aerial vehicle receives a tasking for the performance of a mission. The tasking may be received by the aerial vehicle by any means, e.g., manual or automatic programming, such as by receiving one or more sets of instructions over a network. The mission may involve payload deliveries, law enforcement, surveillance, or any other tasking. At box 620, the aerial vehicle executes one or more pre-flight testing evolutions at a facility. The evolutions may involve the operation of one or more propellers, motors, engines, control surfaces or other hardware aspects of the aerial vehicle, or software systems, and may be tailored for the aerial vehicle specifically, or for one or more aerial vehicles within a class or fleet that includes the aerial vehicle.

At box 630, one or more sensors provided onboard the aerial vehicle capture data during the pre-flight testing evolutions. Simultaneously, or in parallel, at box 635, one or more sensors provided at the facility capture data while the aerial vehicle performs the pre-flight testing evolutions. In some embodiments, the aerial vehicle and/or the testing facility may be outfitted with one or more sensors such as imaging devices, acoustic sensors, or other sensors for capturing any type or form of data from the aerial vehicle during the pre-flight testing evolutions.

At box 640, the data captured during the pre-flight testing evolutions is provided to a trained machine learning system. The data may be transmitted over one or more networks to a physical or virtual server having one or more processors, data stores or like components. The trained machine learning system may be one or more nearest neighbor methods or analyses, artificial neural networks, conditional random fields, factorization methods or techniques, K-means clustering analyses or techniques, similarity measures such as log likelihood similarities or cosine similarities, latent Dirichlet allocations or other topic models, or latent semantic analyses, or any other machine learning system that is trained to associate testing and/or operational data with an outcome of a mission to be performed by an aerial vehicle.

At box 650, whether the aerial vehicle is expected to successfully complete the mission with which it is tasked is determined, e.g., based on an output received from the machine learning system, or on any other basis. For example, in some embodiments, a binary indication as to a predicted outcome of the mission, e.g., that the mission will be a success or a failure, may be determined. In some other embodiments, one or more predicted metrics, values or other information regarding the mission (or one or more rates of change and/or acceleration associated with such metrics, values or other information) may be determined. If the aerial vehicle is not expected to successfully complete the mission, then the process advances to box 655, where the aerial vehicle is blocked from performing the mission. In some embodiments, the aerial vehicle may be subjected to further inspections or evaluations, e.g., by one or more humans or machines. The mission with which the aerial vehicle was tasked may be canceled, delayed pending such inspections or evaluations, or assigned to another aerial vehicle.

If the aerial vehicle is expected to successfully complete the mission, then the process advances to box 660, where the aerial vehicle departs from the facility to perform the mission. At box 665, one or more sensors provided aboard the aerial vehicle capture data during in-flight evolutions performed by the aerial vehicle during the mission. The sensors that capture the data during the in-flight evolutions may be one or more of the same sensors that captured data during the pre-flight testing evolutions, or one or more different sensors. At box 670, data captured during the in-flight evolutions is provided to the trained machine learning system as inputs, e.g., to a physical or "cloud"-based server by wired or wireless means. Alternatively, the machine learning system may be operated by one or more processors or other computer devices provided aboard the aerial vehicle.

At box 675, whether the aerial vehicle is expected to successfully complete the mission is determined, e.g., based on an output received from the trained machine learning system. If the aerial vehicle is expected to complete the mission, the aerial vehicle is permitted to continue on its mission, and the process advances to box 685, where whether the aerial vehicle has completed the mission is determined. The completion of the mission may be defined based on one or more parameters or characteristics of the mission, and determined by any means or on any basis. For example, where a mission involves the delivery or retrieval of an item at a location, the mission may be defined as complete using a position sensor, e.g., to confirm that the aerial vehicle is at or near the location, and using one or more sensors associated with a payload engagement system, e.g., to determine the status of the system, such as whether the item is located therein or has been ejected or deployed therefrom.

If the aerial vehicle is not expected to complete the mission, then the process advances to box 680, where the aerial vehicle aborts the mission. For example, the aerial vehicle may be instructed to return to an origin, to land at a nearest suitable location, or to perform an additional or alternative mission in place of the original mission.

After the aerial vehicle has been blocked from the mission at box 655, after the aerial vehicle has aborted the mission at box 680, or after the aerial vehicle has completed the mission at box 685, the process advances to box 690, where the aerial vehicle determines data regarding an outcome of the mission. The data may include an indicator as to the success or failure of the mission, or any qualitative or quantitative metrics, values or other information regarding the performance of the mission. At box 695, the aerial vehicle reports the data that was captured pre-flight and in-flight to the machine learning system, e.g., to further train the machine learning system based on the data captured during the pre-flight testing evolutions, the data captured during the in-flight evolutions and the data regarding the outcome, and the process ends.

Figure 7:
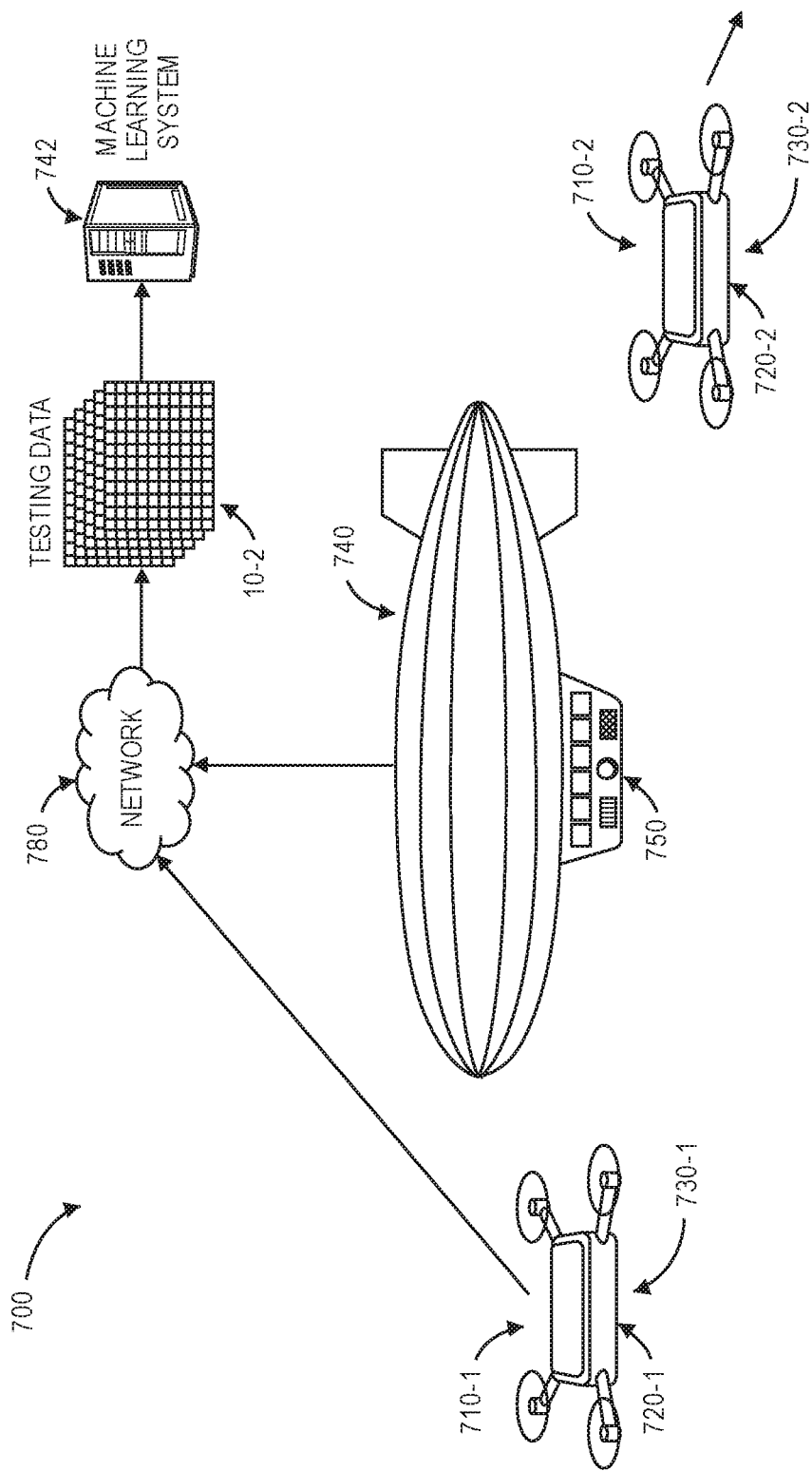
FIG. 7 is a view of aspects of one system for automated pre-flight or in-flight testing of aerial vehicles in accordance with embodiments of the present disclosure

As is discussed above, data regarding one or more pre-flight or in-flight evolutions performed by an aerial vehicle may be captured using one or more sensors provided aboard the aerial vehicle, or using one or more sensors provided in an alternate location, e.g., a facility configured for capturing such data. The facilities may be provided in one or more ground-based locations, or in any other location, such as aboard one or more other aerial vehicles. Referring to FIG. 7, a view of aspects of one system 700 for automated pre-flight or in-flight testing of aerial vehicles in accordance with embodiments of the present disclosure is shown. Except where otherwise noted, reference numerals preceded by the number "7" shown in FIG. 7 indicate components or features that are similar to components or features having reference numerals preceded by the number "5" shown in FIG. 5, by the number "4" shown in FIGS. 4A and 4B, by the number "2" shown in the block diagram of FIG. 2, or by the number "1" shown in FIGS. 1A through 1L.

As is shown in FIG. 7, the system 700 includes a pair of aerial vehicles 710-1, 710-2 and an airborne testing facility 740. The aerial vehicles 710-1, 710-2 may each include one or more environmental or operational sensors 720-1, 720-2 and/or one or more test sensors 730-1, 730-2 provided thereon. In some embodiments, each of the aerial vehicles 710-1, 710-2 may be outfitted with the same sets of environmental or operational sensors 720-1, 720-2 and/or test sensors 730-1, 730-2. In some other embodiments, the aerial vehicles 710-1, 710-2 may be outfitted with different sets of environmental or operational sensors 720-1, 720-2 and/or 730-1, 730-2.

The airborne testing facility 740 may be any type or form of aerial vehicle, airship or other body that is capable of remaining aloft without support from any ground-based structure (e.g., an orbiting satellite). Alternatively, an airborne testing facility 740 may be provided atop or in association with one or more ground-based structures (e.g., buildings, utility poles or antennas, or like structures). The airborne testing facility 740 may be outfitted with a plurality of sensors 750, e.g., microphones (or other acoustic sensors), imaging devices, vibration sensors, current sensors, voltage sensors or thermometers, or any other sensors.

In accordance with the present disclosure, one or more of the aerial vehicles 710-1, 710-2 may enter within operating ranges of one or more of the sensors 750 of the airborne testing facility 740, and execute one or more evolutions. In some embodiments, the aerial vehicles 710-1, 710-2 need not physically come into contact with the airborne testing facility 740 during any of such evolutions. In other embodiments, the aerial vehicles 710-1, 710-2 may be connected to the airborne testing facility 740, e.g., by one or more tethers and/or wired connections, during any of such evolutions. Data captured by environmental or operational sensors 720-1, 720-2 and/or one or more test sensors 730-1, 730-2 of the aerial vehicles 710-1, 710-2 or the sensors 750 of the airborne testing facility 740 may be provided to a server 742 over a network, along with any data regarding outcomes of missions performed by the aerial vehicles 710-1, 710-2, or attributes of such missions, and used to train a machine learning system operating thereon. Alternatively, where the server 742 operates one or more trained machine learning systems, the data may be provided to the server 742 and to the trained machine learning systems as inputs, and data regarding outcomes of missions to be performed by the aerial vehicles 710-1, 710-2 may be determined or predicted based on outputs received from the trained machine learning systems. Instructions or commands for taking one or more actions may be provided to the aerial vehicles 710-1, 710-2 over the network 780 or, alternatively, by way of the airborne testing facility 740.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIGS. 3A and 3B or 6A and 6B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
    a landing area;
    a first plurality of sensors associated with the landing area, wherein the first plurality of sensors comprises at least one of an acoustic sensor, a current sensor, an imaging device, a load sensor, a vibration sensor, a voltage sensor, a tachometer or a thermometer, and wherein the landing area is within an operating range of each of the first plurality of sensors; and
    a computer server connected to at least one network, wherein the computer server is in communication with each of the first plurality of sensors, and
    wherein the computer server is configured to at least:
        cause a first aerial vehicle to perform at least a first evolution while at least a portion of the first aerial vehicle is grounded on the landing area, wherein the first evolution comprises an operation of at least one component of the first aerial vehicle while at least the portion of the first aerial vehicle is grounded on the landing area;
        determine, by at least some of the first plurality of sensors, first data regarding the first aerial vehicle during at least the first evolution;
        provide at least some of the first data to a machine learning system as a first input, wherein the machine learning system is trained to predict an outcome of a first mission of the first aerial vehicle based at least in part on data captured by at least one of the first plurality of sensors;
        receive a first output from the machine learning system based at least in part on the first input;
        determine, based at least in part on the first output, that the first aerial vehicle is likely to complete a first mission; and
        cause the first aerial vehicle to take off from the landing area and perform the first mission.

2. The system of claim 1, wherein the computer server is further configured to at least:
    receive, from the first aerial vehicle over the at least one network, second data regarding the first aerial vehicle during at least the first evolution, wherein the second data is captured by at least one of a second plurality of sensors provided aboard the first aerial vehicle; and
    provide at least some of the second data to the machine learning system as a second input, wherein the machine learning system is trained to predict the outcome of the first mission based at least in part on data captured by at least one of the first plurality of sensors and data captured during at least the first evolution, and
    wherein the first output is received from the machine learning system based at least in part on the first input and the second input.

3. The system of claim 1, wherein the computer server is further configured to at least:
    during the first mission,
        receive, from the first aerial vehicle over the at least one network, second data regarding the first aerial vehicle during at least a portion of the first mission, wherein the second data is captured by at least one of a second plurality of sensors provided aboard the first aerial vehicle;

provide at least some of the second data to the machine learning system as a second input, wherein the machine learning system is trained to predict the outcome of the first mission based at least in part on data captured during at least one of the first evolution or the second evolution;

receive a second output from the machine learning system based at least in part on the second input;

determine, based at least in part on the second output, that the first aerial vehicle is unlikely to complete the first mission; and cause the first aerial vehicle to abort the first mission.

4. A method comprising:

causing a first aerial vehicle to execute a first operation of at least one component of the first aerial vehicle, wherein the first operation is executed with the first aerial vehicle grounded or airborne not greater than a predetermined altitude within an operating range of at least a first sensor associated with a ground-based facility;

capturing first data during the first operation by at least the first sensor;

providing at least some of the first data to a machine learning system as a first input, wherein the machine learning system is trained to predict data regarding an outcome of a mission to be performed by an aerial vehicle based at least in part on data captured during at least one operation of the aerial vehicle;

receiving, from the machine learning system, a first output based at least in part on at least the first input; and predicting second data regarding a first outcome of a first mission of the first aerial vehicle based at least in part on the first output.

5. The method of claim 4, wherein the first operation comprises at least one of:

operating a propulsion motor of the first aerial vehicle at a first predetermined rotating speed;

changing a speed of the propulsion motor from the first predetermined rotating speed to a second predetermined rotating speed;

operating a control surface of the first aerial vehicle from a first position to a second position;

extending or retracting a landing component of the first aerial vehicle;

retrieving or releasing an object by a payload engagement system of the first aerial vehicle;

operating an imaging device provided on the first aerial vehicle; or supplying power to at least one of the propulsion motor, the control surface, the landing component, the payload engagement system or the imaging device.

6. The method of claim 4, wherein the first aerial vehicle is tethered to a ground surface during the first operation.

7. The method of claim 4, further comprising:

capturing third data during the first operation by at least a second sensor associated with at least one of the first aerial vehicle, a second aerial vehicle or the ground-based facility, wherein providing at least some of the first data to the machine learning system as the first input comprises:

providing at least some of the first data and at least some of the third data to the machine learning system as the first input.

8. The method of claim 7, wherein the second sensor is at least one tachometer, wherein the third data comprises at least an operating speed of the propulsion motor of the first aerial vehicle.

9. The method of claim 4, wherein the first sensor is at least one acoustic sensor, and wherein the first data comprises at least one of a frequency or a sound pressure level of a sound emitted by at least a portion of the first aerial vehicle during the first operation.

10. The method of claim 7, wherein the second sensor is at least one of a current sensor or a voltage sensor, and wherein the third data comprises at least one of a current or a voltage supplied to the at least one component during the first operation.

11. The method of claim 4, wherein the first sensor is at least one temperature sensor, and wherein the first data comprises at least an operating temperature of at least a portion of the at least one component during the first operation.

12. The method of claim 4, wherein the first sensor is at least one imaging device, and wherein the first data comprises at least one image of the at least one component captured by the at least one imaging device during the first operation.

13. The method of claim 4, wherein predicting the second data regarding the first outcome of the first mission of the first aerial vehicle comprises:

determining whether the first mission is likely to succeed based at least in part on the second data; and one of:

in response to determining that the first mission is likely to succeed,
causing the first aerial vehicle to embark on the first mission; or in response to determining that the first mission is not likely to succeed, at least one of:
causing the first aerial vehicle to land at one of an origin of the first mission or an alternate location;
canceling the first mission; or
causing a second aerial vehicle to embark on the first mission.

14. The method of claim 4, further comprising:

prior to causing the first aerial vehicle to execute the first operation of the at least one component of the first aerial vehicle,
causing at least a second aerial vehicle to execute a second operation of at least one component of at least the second aerial vehicle;
capturing third data during the second operation by at least a second sensor;
determining fourth data regarding at least a second outcome of at least a second mission of the second aerial vehicle; and
training the machine learning system to associate at least the third data with at least the fourth data.

15. The method of claim 4, wherein the machine learning system is one of:

a nearest neighbor method;
an artificial neural network;
a conditional random field;
a factorization method;
a K-means clustering analysis;
a log likelihood similarity measure;
a cosine similarity measure;
a latent Dirichlet allocation; or
a latent semantic analysis.

16. The method of claim 4, further comprising:
determining at least one attribute of the first mission,
wherein predicting the second data regarding the first outcome of the first mission of the first aerial vehicle comprises:
  predicting the second data regarding the first outcome of the first mission of the first aerial vehicle based at least in part on the first output and the at least one attribute of the first mission.

17. A system comprising:
at least a first sensor associated with one of a ground-based testing facility or an airborne testing facility;
at least one data store; and
at least one computer processor in communication with at least the first sensor and connected to at least one network,
wherein the at least one computer processor is configured to at least:
  capture, by the first sensor, data during performance of a plurality of testing evolutions by each of a plurality of aerial vehicles;
  receive, from each of the plurality of aerial vehicles, data regarding outcomes of missions performed by the plurality of aerial vehicles following the performance of the plurality of testing evolutions by the plurality of aerial vehicles;
  train a machine learning system to associate at least some of the data captured during the performance of the plurality of testing evolutions with at least some of the data regarding the outcomes of the missions;
  capture, by the first sensor, first data during performance of at least a first testing evolution by a first aerial vehicle;
  provide at least some of the first data to the trained machine learning system as a first input;
  receive a first output from the trained machine learning system; and
  predict an outcome for a first mission of the first aerial vehicle based at least in part on the first output,
wherein the first sensor is not provided aboard the first aerial vehicle or any of the plurality of aerial vehicles.

18. The system of claim 17, wherein the plurality of testing evolutions comprises a sequence of operations of each of a plurality of powered elements aboard an aerial vehicle,
wherein the plurality of powered elements includes at least one propulsion motor, at least one control surface, at least one landing component or at least one aspect of a payload engagement system,
wherein the first data is captured during performance of the plurality of testing evolutions by the first aerial vehicle, and
wherein the first testing evolution is one of the operations of one of the plurality of powered elements aboard the aerial vehicle.

19. The system of claim 17, wherein
the first aerial vehicle is tethered to at least one surface at the ground-based testing facility or within an operating range of the first sensor from the airborne testing facility during the performance of the first testing evolution.

20. The system of claim 17, wherein the at least one computer processor is further configured to at least:
  capture, by a second sensor provided aboard the first aerial vehicle, second data during the performance of at least the first testing evolution by the first aerial vehicle; and
  provide at least some of the second data to the trained machine learning system, wherein the first input comprises the at least some of the first data and the at least some of the second data.

* * * * *